(12) United States Patent
Sawaki et al.

(10) Patent No.: US 11,882,172 B2
(45) Date of Patent: Jan. 23, 2024

(54) NON-TRANSITORY COMPUTER-READABLE MEDIUM, INFORMATION PROCESSING METHOD AND INFORMATION PROCESSING APPARATUS

(71) Applicant: COLOPL, INC., Tokyo (JP)

(72) Inventors: Kazuaki Sawaki, Tokyo (JP); Eita Kikuchi, Tokyo (JP)

(73) Assignee: COLOPL, INC., Tokyo (JP)

( * ) Notice: Subject to any disclaimer, the term of this patent is extended or adjusted under 35 U.S.C. 154(b) by 120 days.

(21) Appl. No.: 17/622,643

(22) PCT Filed: Jun. 5, 2020

(86) PCT No.: PCT/JP2020/022416
§ 371 (c)(1),
(2) Date: Dec. 23, 2021

(87) PCT Pub. No.: WO2020/261945
PCT Pub. Date: Dec. 30, 2020

(65) Prior Publication Data
US 2022/0360619 A1    Nov. 10, 2022

(30) Foreign Application Priority Data
Jun. 26, 2019   (JP) .................................. 2019-118918

(51) Int. Cl.
*G06F 15/173*   (2006.01)
*H04L 67/02*   (2022.01)
(Continued)

(52) U.S. Cl.
CPC .......... *H04L 67/02* (2013.01); *G02B 27/0172* (2013.01); *G06F 3/011* (2013.01); *G06F 16/9566* (2019.01)

(58) Field of Classification Search
None
See application file for complete search history.

(56) References Cited

U.S. PATENT DOCUMENTS 10,049,493 B1 *   8/2018   Verizzo ............... G06F 9/45558
10,573,060 B1 *   2/2020   Ascolese ................ A63F 13/52
(Continued)

FOREIGN PATENT DOCUMENTS

| JP | 2017-041780 A | 2/2017 |
| JP | 2018-195255 A | 12/2018 |
| KR | 2017-0035958 A | 3/2017 |

OTHER PUBLICATIONS

Japanese Patent Office, Notice of Reasons for Refusal, Application No. JP2019-118918, dated May 9, 2023, in 4 pages.
(Continued)

*Primary Examiner* — Phuoc H Nguyen
(74) *Attorney, Agent, or Firm* — Procopio, Cory, Hargreaves & Savitch LLP

(57) ABSTRACT

A program causes a processor to carry out: a step of defining a virtual space including a web browser; a step of providing web content on the web browser based on an access to a URL address, a step of providing the web content displayed on the web browser as a 360-degree web content developed in the virtual space based on a first operation input of a user; a step of controlling a field-of-view from a virtual camera arranged in the virtual space in accordance with a movement of a head of the user; and a step of displaying a field-of-view image corresponding to the field-of-view on an image display apparatus associated with the head of the user. The web content and the 360-degree web content are web screens for selecting moving image content to be reproduced from one or more pieces of moving image content.

18 Claims, 21 Drawing Sheets

(51) Int. Cl.
*G06F 16/955* (2019.01)
*G02B 27/01* (2006.01)
*G06F 3/01* (2006.01)

(56) References Cited

U.S. PATENT DOCUMENTS

| | | |
|---|---|---|
| 2015/0205494 A1 | 7/2015 | Scott et al. |
| 2016/0025981 A1 | 1/2016 | Burns et al. |
| 2016/0025982 A1 | 1/2016 | Sutherland et al. |
| 2016/0026242 A1 | 1/2016 | Burns et al. |
| 2016/0027212 A1 | 1/2016 | Da Veiga et al. |
| 2016/0027213 A1 | 1/2016 | Burns et al. |
| 2016/0027214 A1 | 1/2016 | Memmott et al. |
| 2016/0027215 A1 | 1/2016 | Burns et al. |
| 2016/0027216 A1 | 1/2016 | da Veiga et al. |
| 2016/0027217 A1 | 1/2016 | da Veiga et al. |
| 2016/0027218 A1 | 1/2016 | Salter et al. |
| 2018/0003982 A1 | 1/2018 | Burns et al. |
| 2018/0068489 A1* | 3/2018 | Kim ............... G06T 19/006 |
| 2018/0095649 A1 | 4/2018 | Valdivia et al. |
| 2018/0101994 A1 | 4/2018 | Da Veiga et al. |
| 2018/0184000 A1* | 6/2018 | Lee ............... H04N 23/698 |
| 2018/0311585 A1* | 11/2018 | Osman ............ A63F 13/26 |
| 2019/0026958 A1* | 1/2019 | Gausebeck ........ H04N 13/10 |
| 2019/0094981 A1* | 3/2019 | Bradski .......... H04N 21/414 |
| 2019/0139314 A1* | 5/2019 | Marsh ............. G06T 19/20 |
| 2019/0286231 A1 | 9/2019 | Burns et al. |
| 2020/0312029 A1* | 10/2020 | Heinen ............ G06T 17/20 |

OTHER PUBLICATIONS

Nikkei Personal Computing, Online videos to enjoy on your PCs anytime, anywhere, dated Sep. 13, 2010, in 28 pages; cited in International Search Report for Application No. PCT/JP2020/022416 . . . .

Patent Cooperation Treaty, International Preliminary Report on Patentability, Application No. PCT/JP2020/022416, dated Jun. 5, 2020, in 8 pages.

Patent Cooperation Treaty, International Search Report, Application No. PCT/JP2020/022416, dated Aug. 11, 2020, in 5 pages.

Korean Intellectual Property Office, Request for the Submission of an Opinion, Application No. KR10-2021-7042168, dated Oct. 24, 2022, in 10 pages.

European Patent Office, Extended European Search Report, Application No. EP 20 83 3469, dated May 31, 2023, in 7 pages.

* cited by examiner

NON-TRANSITORY COMPUTER-READABLE MEDIUM, INFORMATION PROCESSING METHOD AND INFORMATION PROCESSING APPARATUS

TECHNICAL FIELD

The present invention relates to a program, an information processing method, and an information processing apparatus.

BACKGROUND ART

In recent years, virtual reality (VR) content can be used using a web browser. For example, Patent Literature 1 discloses that a virtual space which is 360-degree content is provided to a terminal device such as a head-mounted display, and predetermined content is provided to a main content display region or a sub-content display region in the virtual space based on an access from a web page corresponding to a uniform resource locator (URL) address.

CITATION LIST

Patent Literature

Patent Literature 1: JP-A-2018-195255

SUMMARY OF INVENTION

Technical Problem

Although the virtual space provided by the method in Patent Literature 1 is the 360-degree content as a whole, the main content itself is only planarly displayed in a limited region, and there is room for improvement from a viewpoint of improving a sense of immersion of a user.

An object of an aspect of the present disclosure is to provide a program, an information processing method, and an information processing apparatus which improve a sense of immersion of a user when VR content is used using a web browser.

Solution to Problem

According to one embodiment of the present disclosure, there is provided a program executed by a computer including a processor, the program causing the processor to perform: a step of defining a virtual space including a web browser; a step of providing web content on the web browser based on an access to a uniform resource locator (URL) address; a step of providing the web content displayed on the web browser as a 360-degree web content developed in the virtual space based on a first operation input of a user; a step of controlling a field-of-view from a virtual camera arranged in the virtual space in accordance with a movement of a head of the user; and a step of displaying a field-of-view image corresponding to the field-of-view on an image display apparatus associated with the head of the user, wherein the web content and the 360-degree web content are web screens for selecting moving image content to be reproduced from one or more pieces of moving image content.

Advantageous Effects of Invention

According to an embodiment of the present disclosure, it is possible to provide a program which improves a sense of immersion of a user when VR content is used using a web browser.

DESCRIPTION OF EMBODIMENTS

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
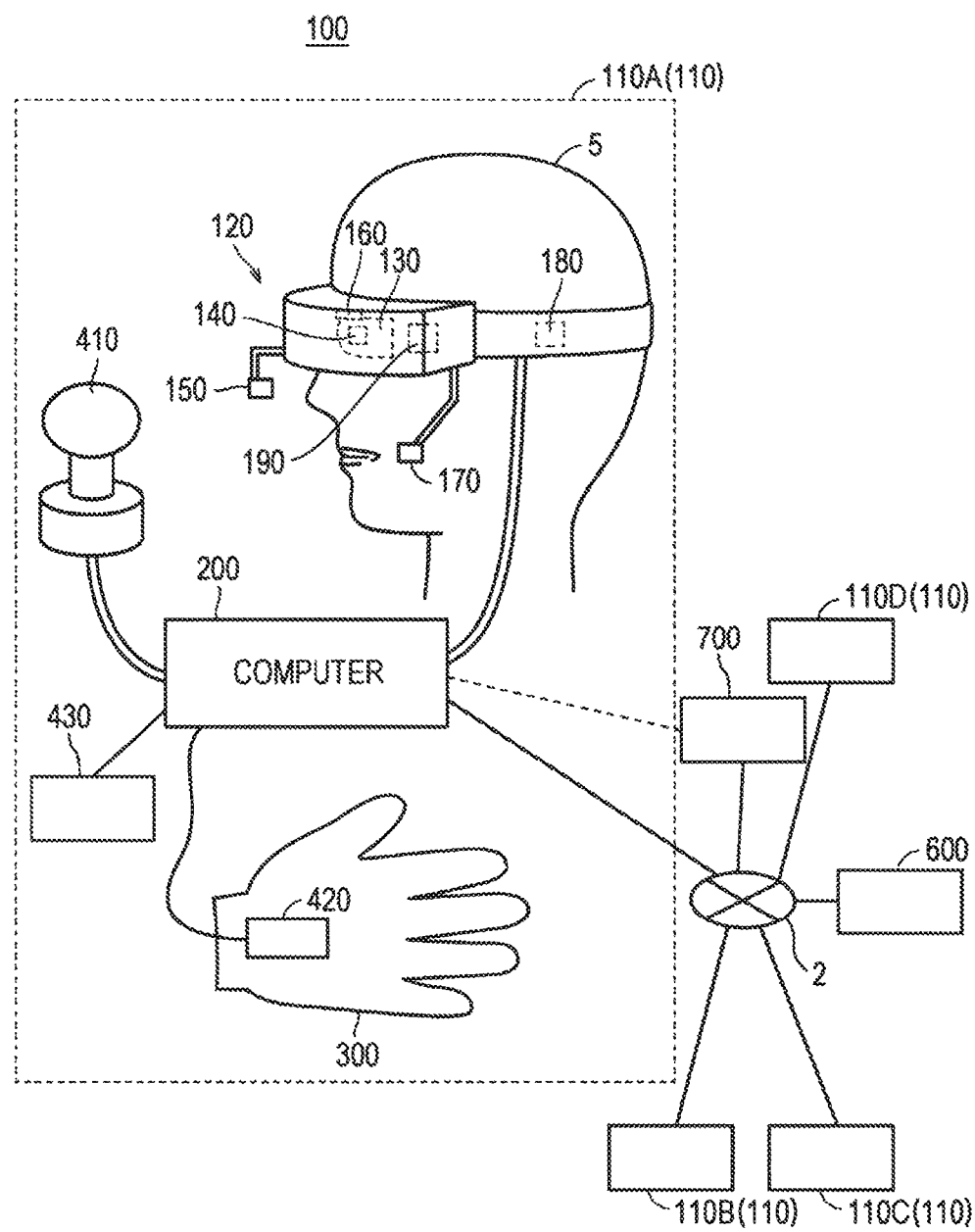
FIG. 1 A diagram of a system including a head-mounted device (HMD) according to one embodiment of this disclosure.

With reference to FIG. 1, a configuration of a head-mounted device (HMD) system 100 is described. FIG. 1 is a diagram of a system 100 including a head-mounted display (HMD) according to one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's eyes. In one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In one embodiment, the transmissive monitor 130 is configured as a temporarily non-transmissive display device through adjustment of a transmittance thereof. In one embodiment, the monitor 130 is configured to display a real space and a part of an image constructing the virtual space simultaneously. For example, in one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in one embodiment, but the external device 700 is not limited thereto.

[Hardware Configuration of Computer]

Figure 2:
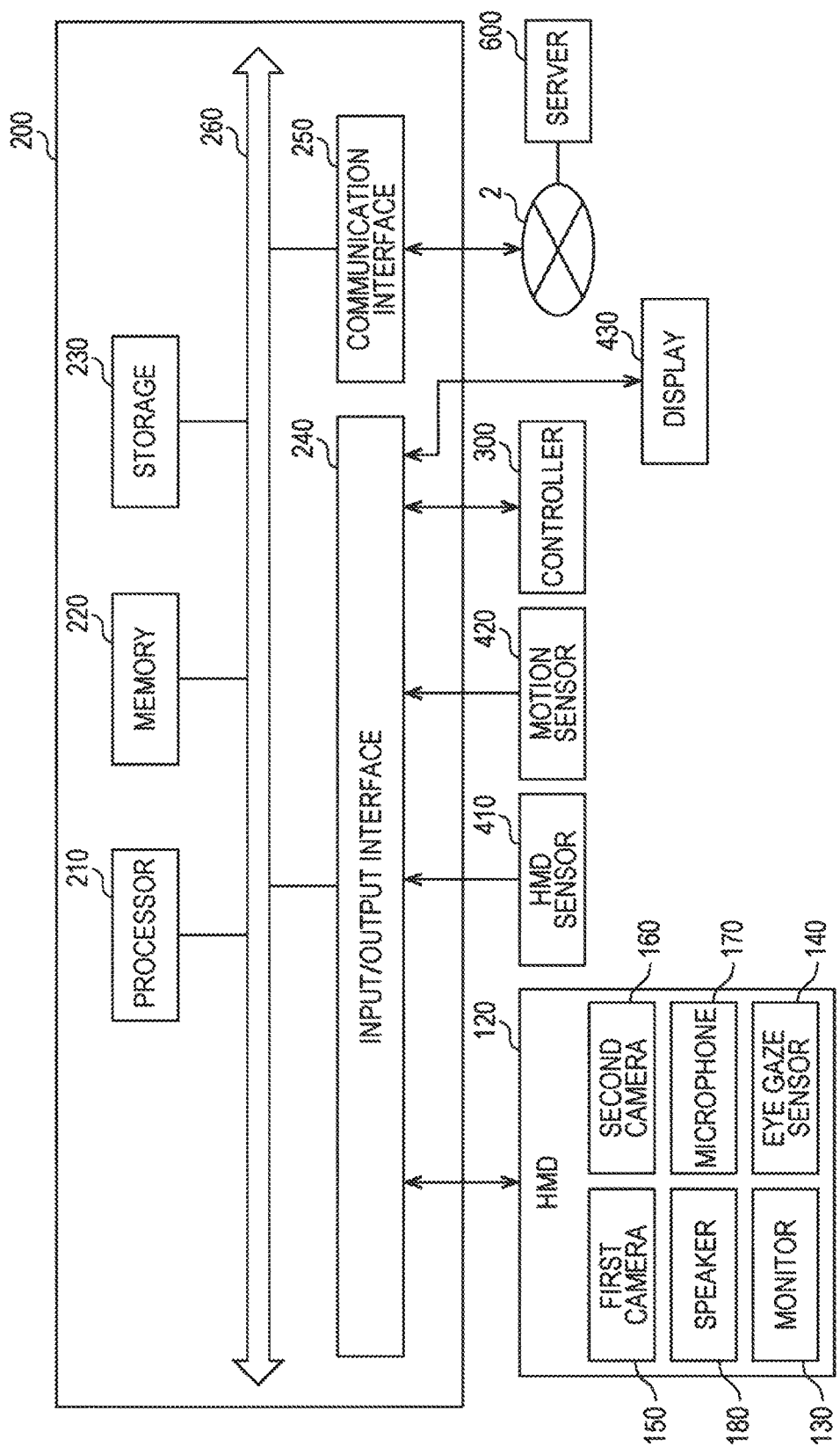
FIG. 2 A block diagram of a hardware configuration of a computer according to one embodiment of this disclosure.

With reference to FIG. 2, the computer 200 in one embodiment is described. FIG. 2 is a block diagram of a hardware configuration of the computer 200 according to one embodiment. The computer 200 includes, a processor 210, a memory 220, a storage 230, an input/output interface 240, and a communication interface 250. Each component is connected to a bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230.

The data includes data input to the computer 200 and data generated by the processor 210. In at least one aspect, the memory 220 is implemented as a random access memory (RAM) or other volatile memories.

The storage 230 permanently stores programs and data. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in one embodiment.

In one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
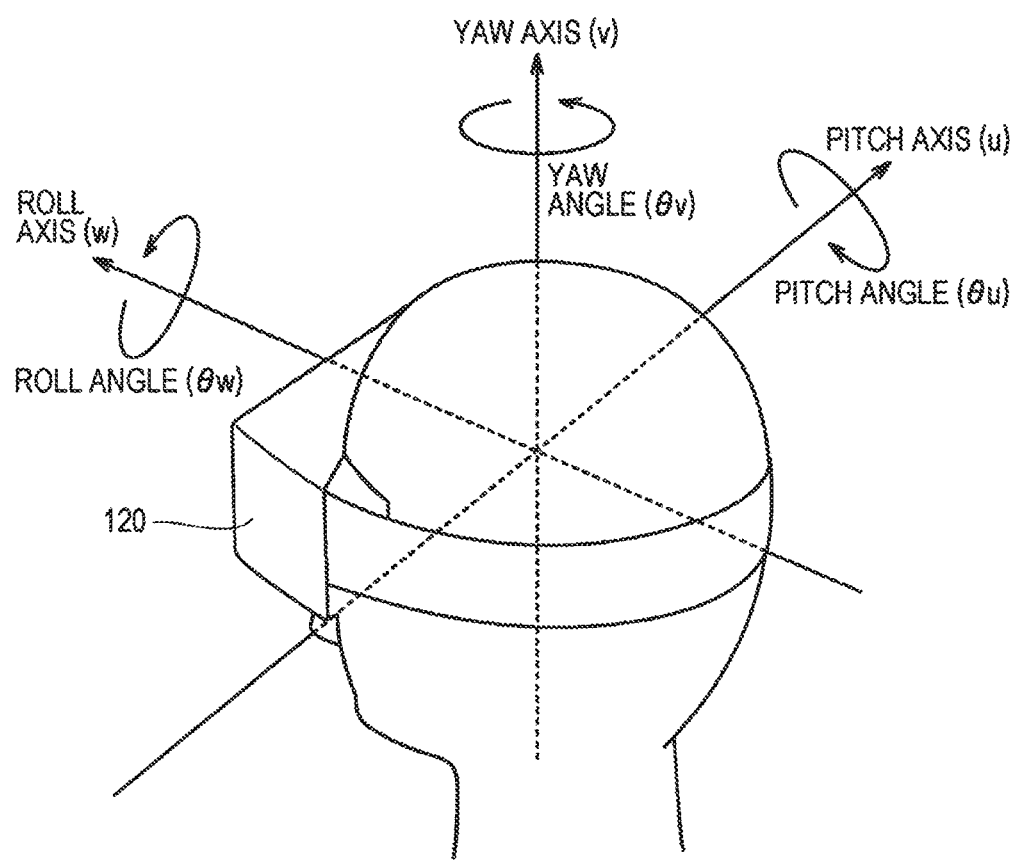
FIG. 3 A diagram of a uvw visual-field coordinate system to be set for an HMD according to one embodiment of this disclosure.

With reference to FIG. 3, the uvw visual-field coordinate system is described. FIG. 3 is a diagram of a uvw visual-field coordinate system to be set for the HMD 120 according to one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle ($θu$), a yaw angle ($θv$), and a roll angle ($θw$) of the HMD 120 in the uvw visual-field coordinate system. The pitch angle ($θu$) represents an inclination angle of the HMD 120 about the pitch axis in the uvw visual-field coordinate system. The yaw angle ($θv$) represents an inclination angle of the HMD 120 about the yaw axis in the uvw visual-field coordinate system. The roll angle ($θw$) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
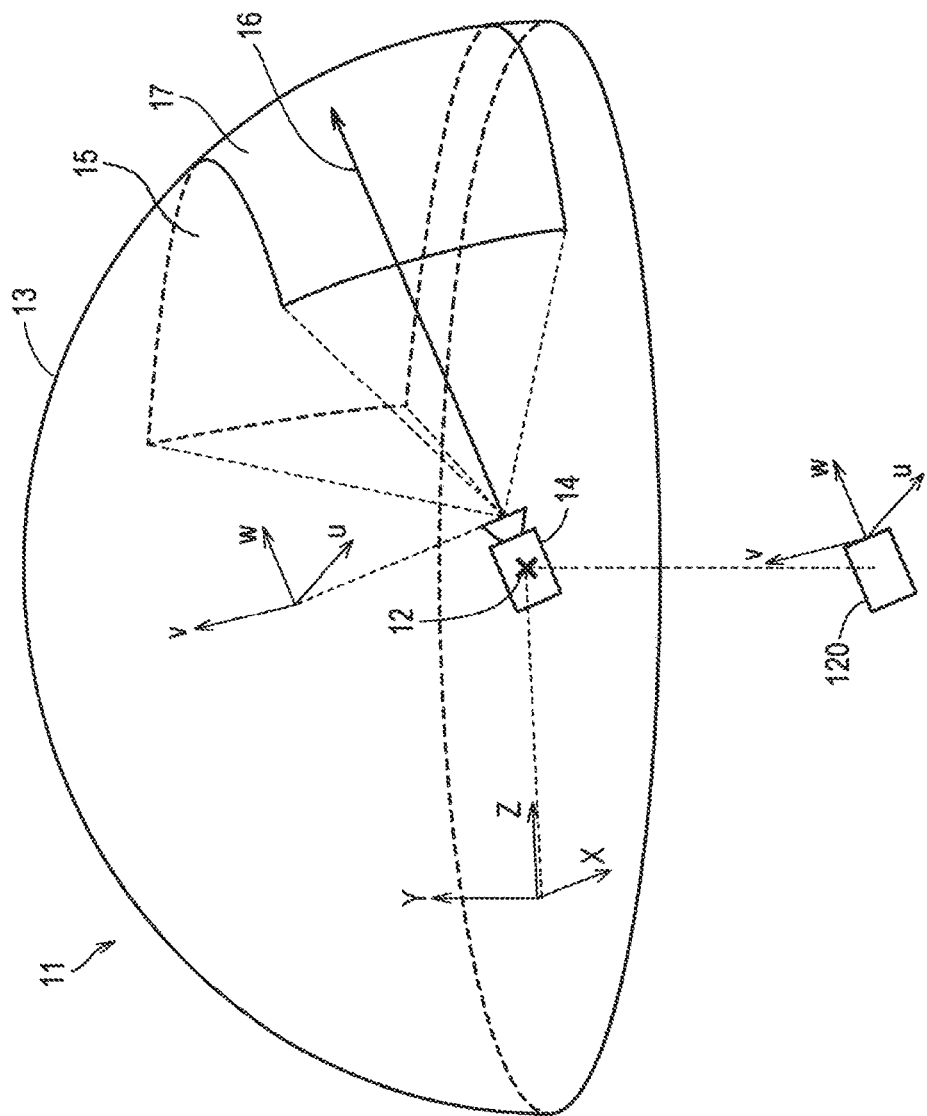
FIG. 4 A diagram of a mode of expressing a virtual space according to one embodiment of this disclosure.

With reference to FIG. 4, the virtual space is further described. FIG. 4 is a diagram of a mode of expressing a virtual space 11 according to one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to they axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
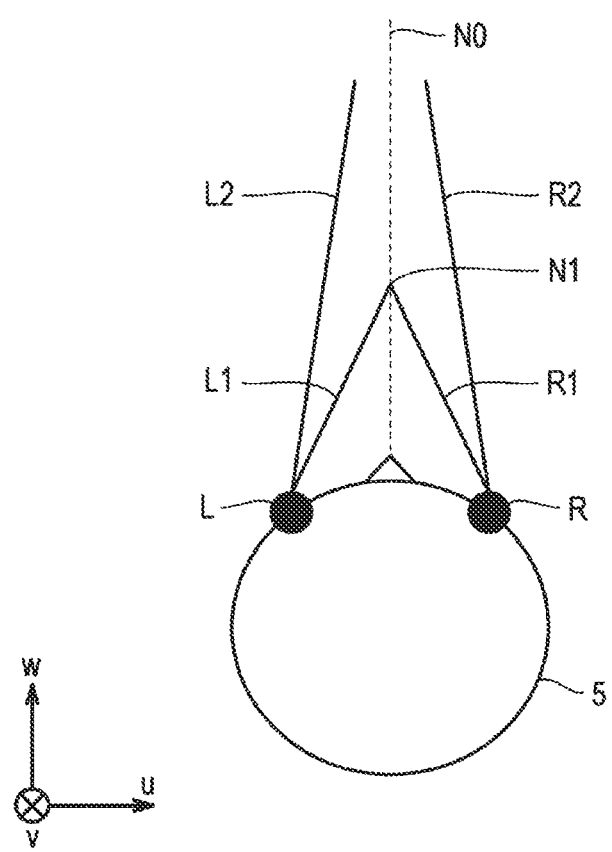
FIG. 5 A diagram of a plan view of a head of a user wearing the HMD according to one embodiment of this disclosure.

With reference to FIG. 5, determination of the line of sight of the user 5 is described. FIG. 5 is a plan view diagram of the head of the user 5 wearing the HMD 120 according to one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
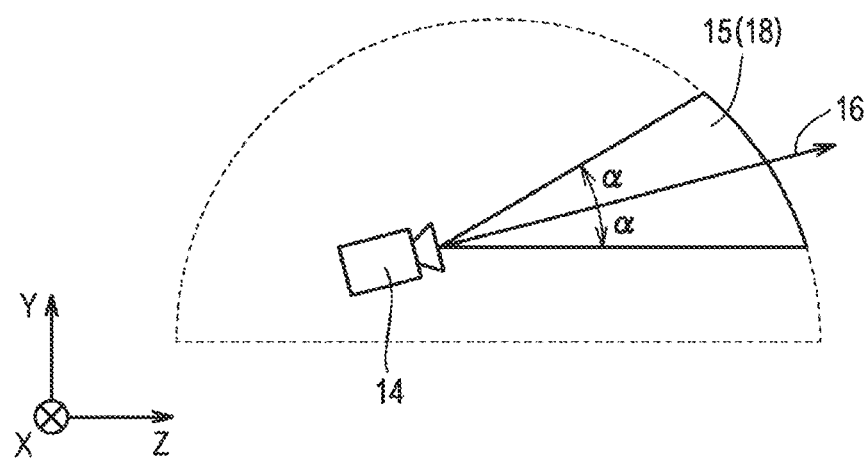
FIG. 6 A diagram of a YZ cross section obtained by viewing a field-of-view region from an X direction in the virtual space according to one embodiment of this disclosure.
Figure 7:
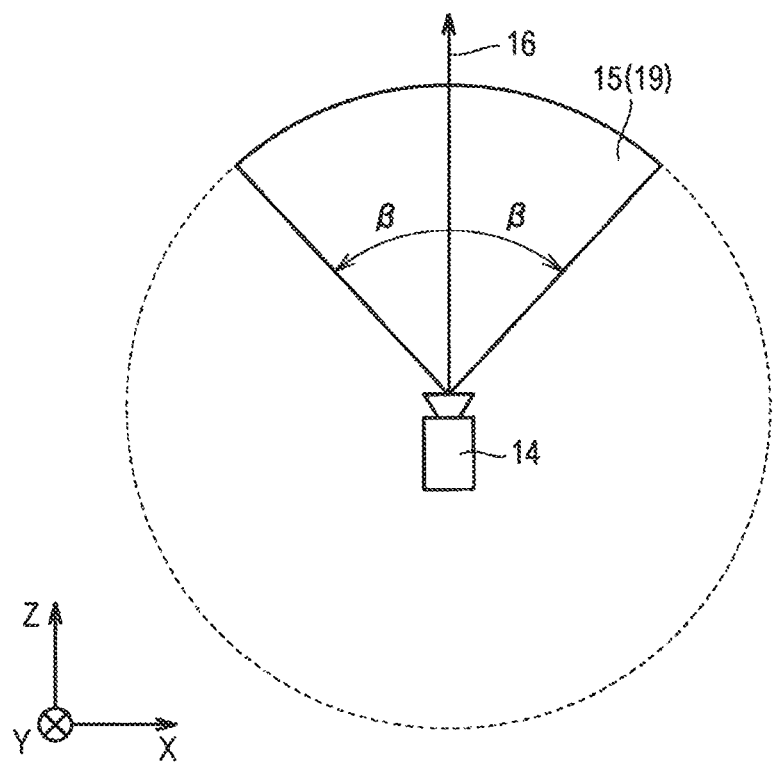
FIG. 7 A diagram of an XZ cross section obtained by viewing the field-of-view region from a Y direction in the virtual space according to one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle a from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth 13 from the reference line of sight 16 serving as the center in the virtual space 11 as the region 19. The polar angle a and 13 are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
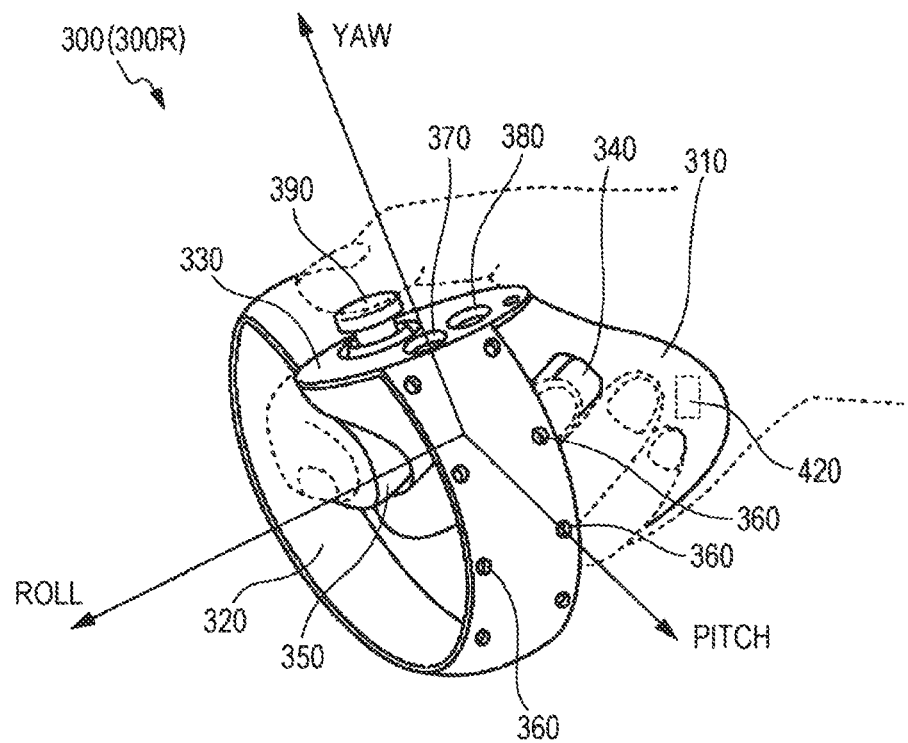
FIG. 8(A) A diagram of a schematic configuration of a controller according to one embodiment of this disclosure.
Figure 8B:
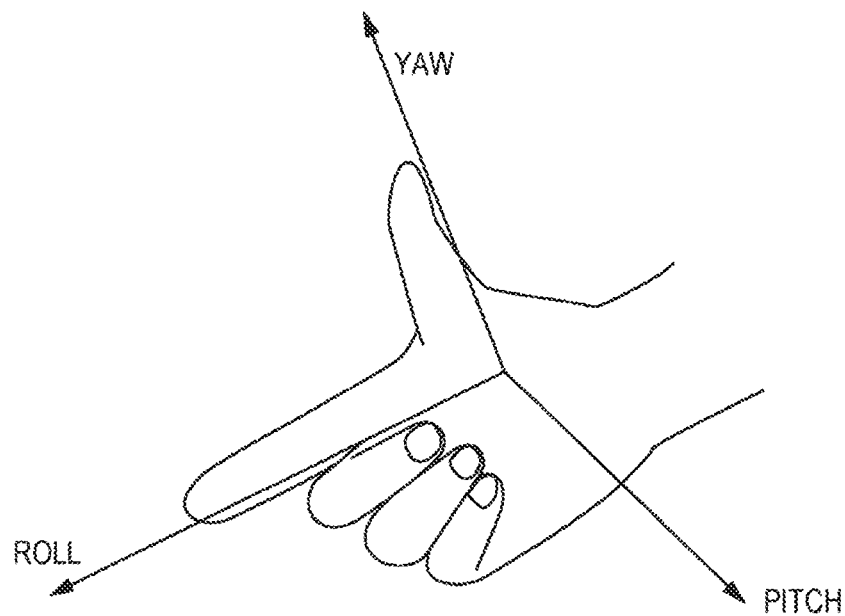
FIG. 8(B) A diagram of a coordinate system to be set for a hand of a user holding the controller according to one embodiment of this disclosure.

An example of the controller 300 is described with reference to FIG. 8(A) and FIG. (B). FIG. 8(A) is a diagram of a schematic configuration of a controller according to one embodiment of this disclosure. FIG. 8(B) is a diagram of a coordinate system to be set for a right hand of a user holding the controller according to one embodiment of this disclosure.

As shown in FIG. 8(A), in one aspect, the controller 300 includes a right controller 300R and a left controller (not shown). The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8(A), the infrared LEDs 360 are shown as being arranged in two rows, but the number of arrangement rows is not limited to that illustrated in FIG. 8(A). In one embodiment, the infrared LEDs 360 are arranged in one row or in three or more rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In one embodiment, the right controller 300R and the left controller do not include a battery.

In FIG. 8(A) and FIG. 8(B), for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

Figure 9:
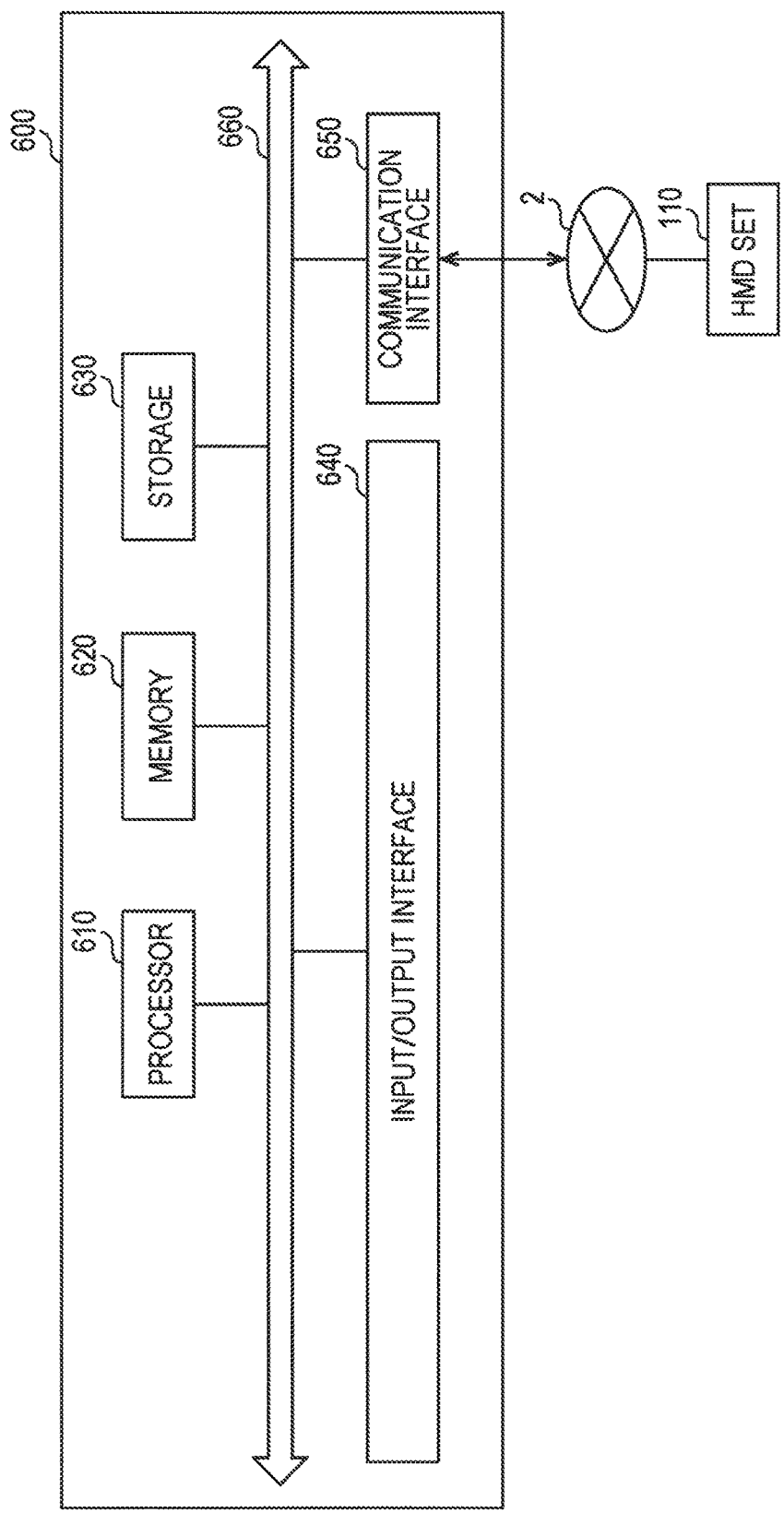
FIG. 9 A block diagram of a hardware configuration of a server according to one embodiment of this disclosure.

With reference to FIG. 9, the server 600 in one embodiment is described. FIG. 9 is a block diagram of a hardware configuration of the server 600 according to one embodiment of this disclosure. The server 600 includes a processor 610, a memory 620, a storage 630, an input/output interface 640, and a communication interface 650. Each component is connected to a bus 660. In one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In one embodiment, the one or more programs include, for example, an operating system of the server 600, an application program for providing a virtual space, and game software that can be executed in the virtual space. In one embodiment, the processor 610 transmits a signal for providing a virtual space to the HMD device 110 to the computer 200 via the input/output interface 640.

[Control Device of HMD]

Figure 10:
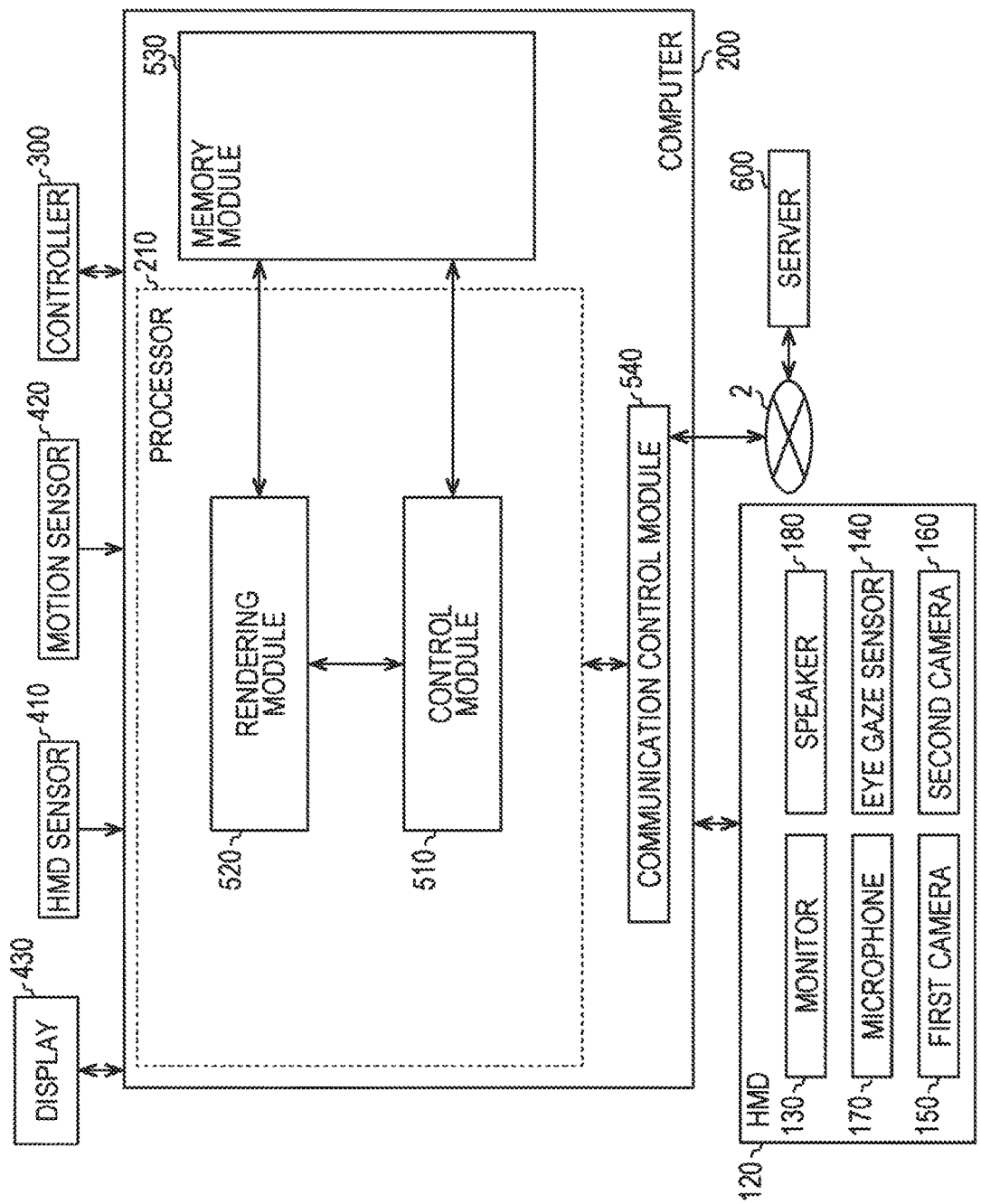
FIG. 10 A block diagram of a computer according to one embodiment of this disclosure.

With reference to FIG. 10, the control device of the HMD 120 is described. According to one embodiment of this disclosure, the control device is implemented by the computer 200 having a known configuration. FIG. 10 is a block diagram of the computer 200 according to one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In one embodiment, the control module 510 generates virtual space data. In one embodiment, the control module 510 acquires virtual space data from, for example, the server 600.

The control module 510 arranges objects in the virtual space 11 using object data representing objects. The object data is stored in, for example, the memory module 530. In one embodiment, the control module 510 generates virtual space data. In one embodiment, the control module 510 acquires virtual space data from, for example, the server 600. In one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In one embodiment, the control module 510 detects a timing at which an object and another object, which have been in contact with each other, have moved away from each other, and performs predetermined processing in response to the detected timing. In one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In one embodiment, the panorama image 13 contains a still image and/or a moving image. In one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In one embodiment, the software is stored in advance on a hard disk or other memory module 530. In one embodiment, the software is stored on a CD-ROM or other computer-readable non-volatile data recording media, and distributed as a program product. In one embodiment, the software may be provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
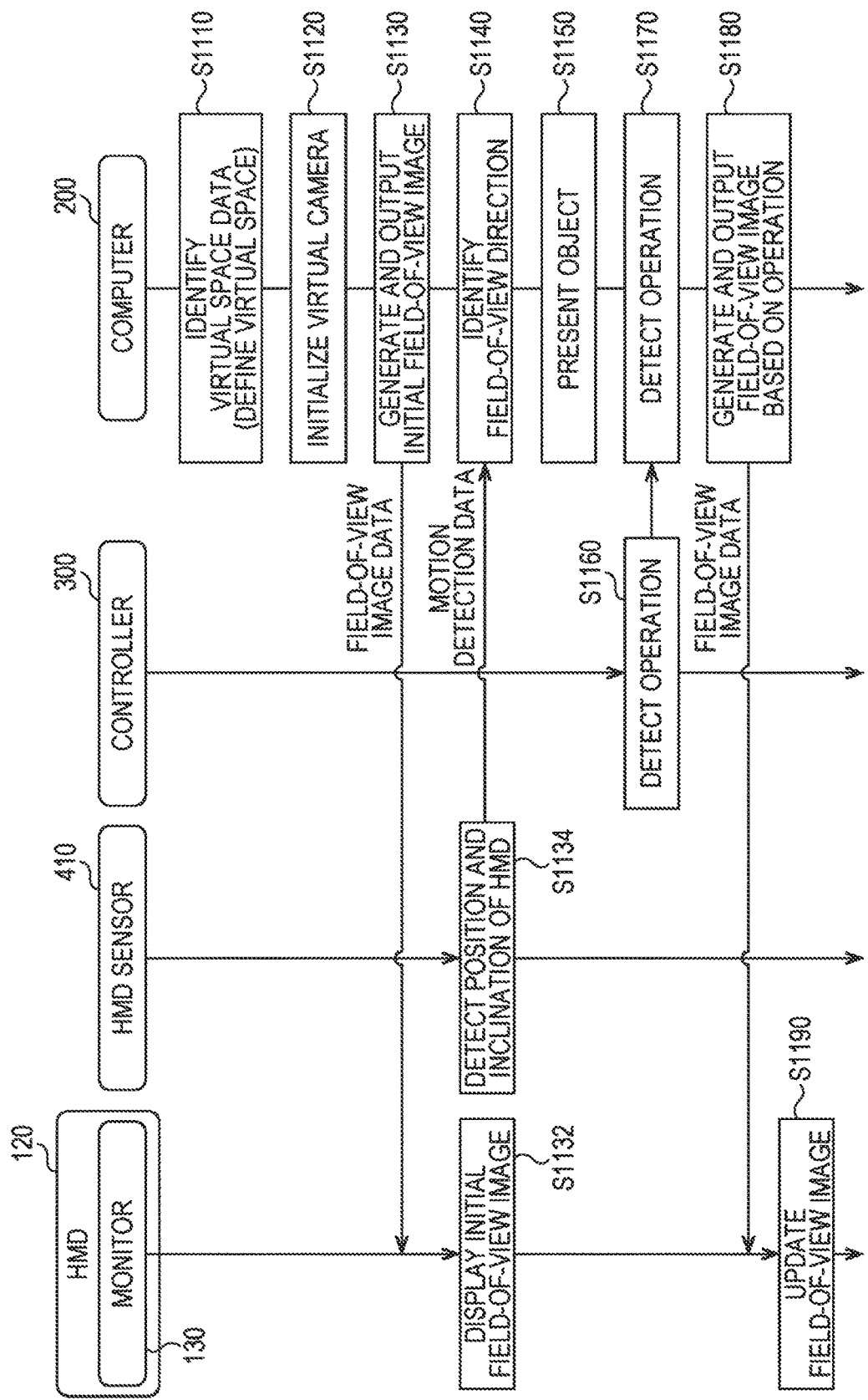
FIG. 11 A sequence chart of processing to be executed by a system including an HMD set according to one embodiment of this disclosure.

With reference to FIG. 11, the control structure of the HMD set 110 is described. FIG. 11 is a sequence chart of processing to be executed by the system 100 according to one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The generated field-of-view image data is output to the HMD 120 by the communication control module 540.

In Step S1190, the HMD 120 updates a field-of-view image based on the received field-of-view image data, and displays the updated field-of-view image on the monitor 130.

[Avatar Object]

Figure 12A:
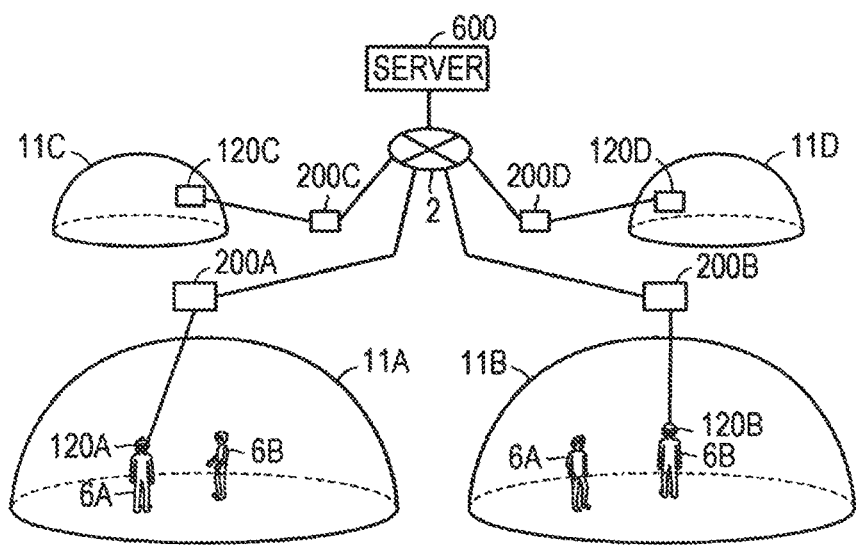
FIG. 12(A) A schematic diagram of HMD systems of several users sharing the virtual space interact using a network according to one embodiment of this disclosure.
Figure 12B:
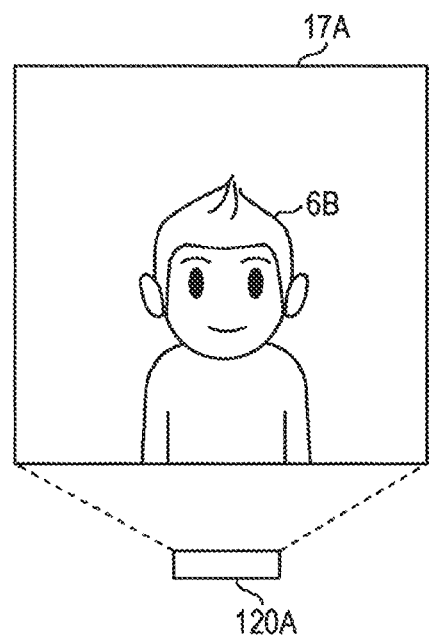
FIG. 12(B) A diagram of a field of view image of a user 6A in FIG. 12(A).

With reference to FIG. 12(A) and FIG. 12(B), an avatar object according to one embodiment is described. They are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12(A) is a schematic diagram of HMD systems, in which each HMD 120 provides the user 5 with the virtual space 11. Computers 200A to 200D provide the users 5A to 5D with virtual spaces 11A to 11D via HMDs 120A to 120D, respectively. In FIG. 12(A), the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12(B) is a diagram of a field of view of a HMD according to one embodiment of this disclosure. FIG. 12(B) corresponds to the field-of-view region 17A of the user 5A in FIG. 12(A). The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12(B), the avatar object 6A of the user 5A is displayed in the field-of-view image of the user 5B.

In the arrangement in FIG. 12(B), the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
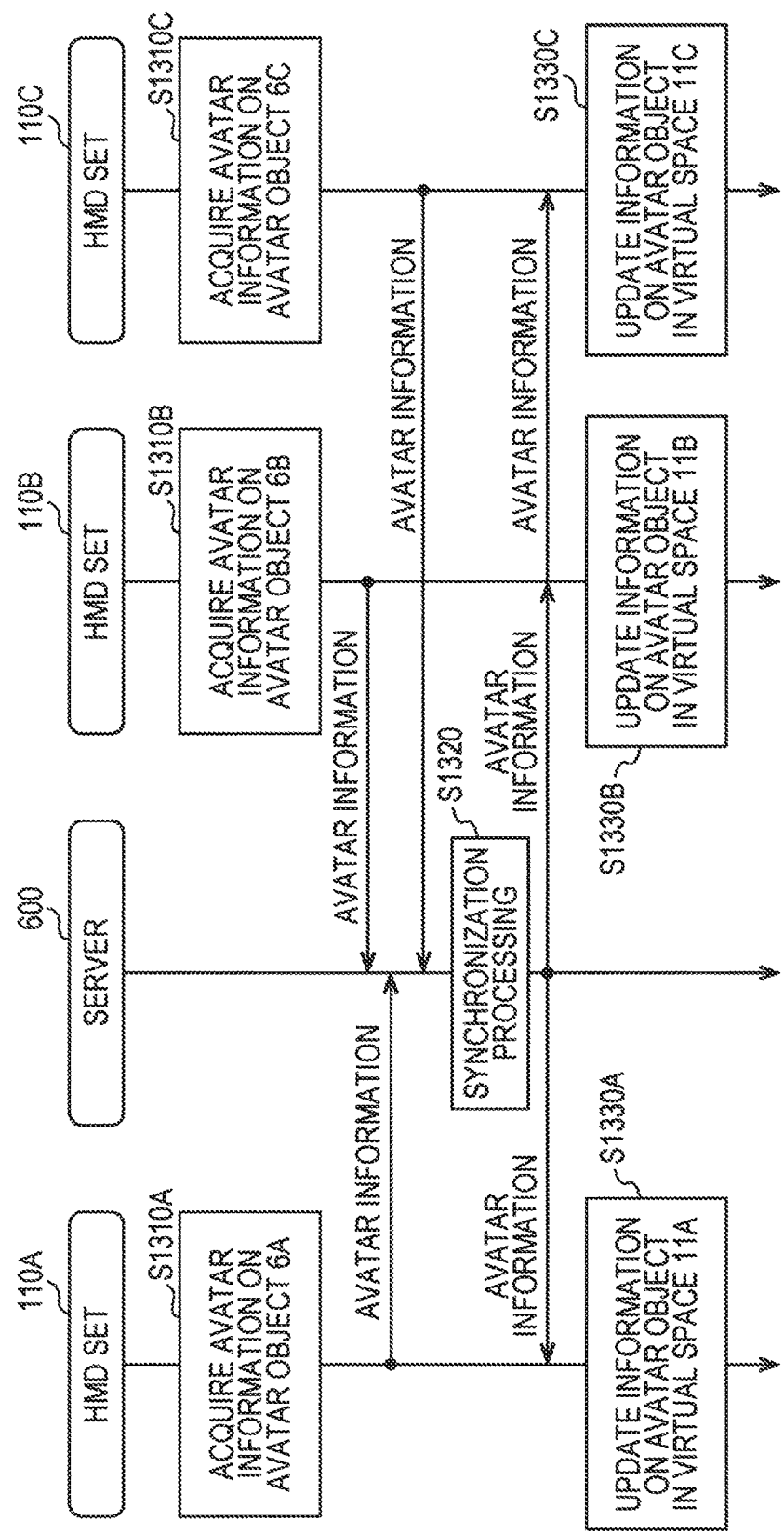
FIG. 13 A sequence diagram of processing to be executed by a system including an HMD interacting in a network according to one embodiment of this disclosure.

FIG. 13 is a sequence chart of processing to be executed by the system 100 according to one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD set 110C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similar to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Detailed Configuration of Module]

Figure 14:
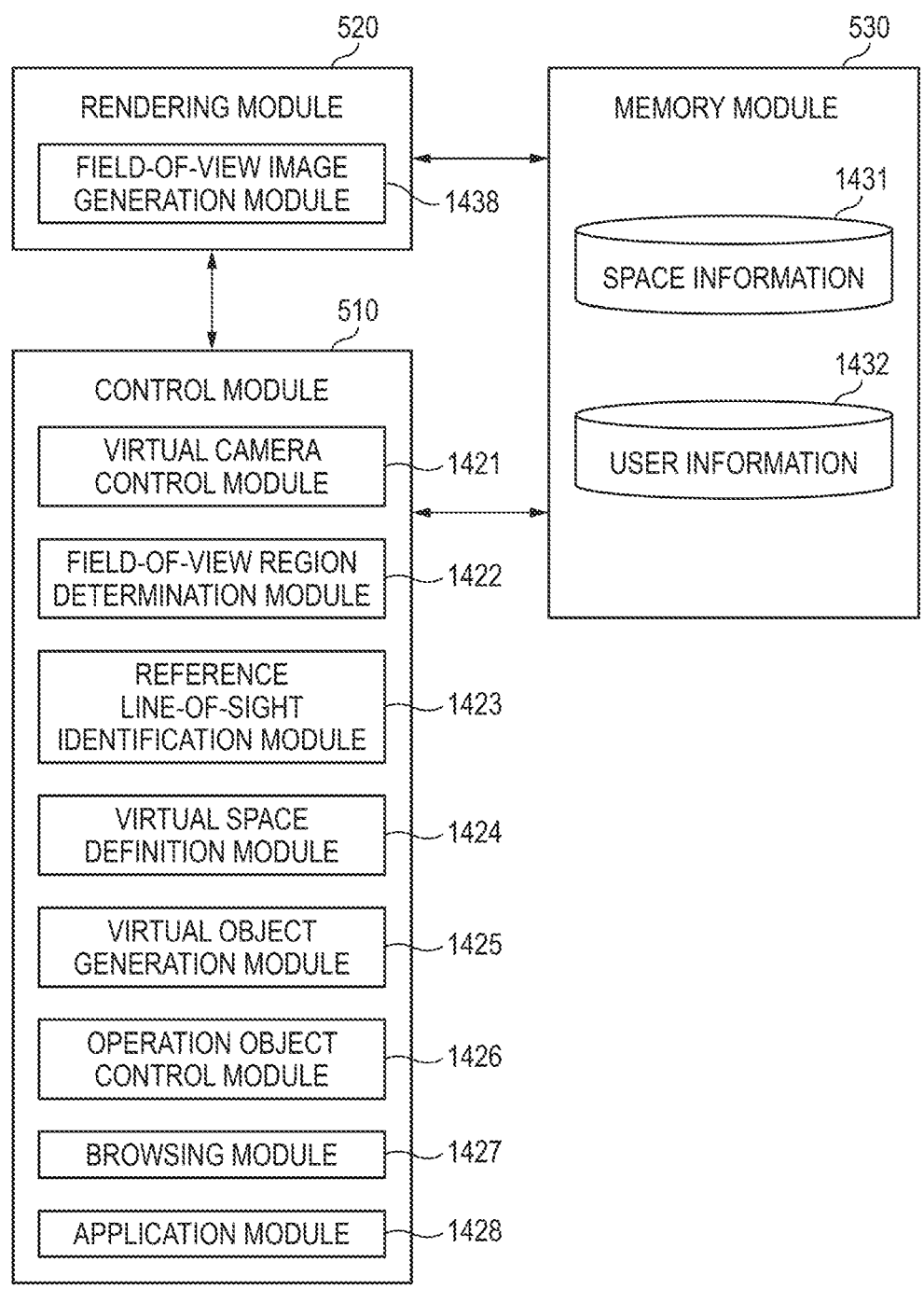
FIG. 14 A block diagram of a configuration of modules in a computer according to one embodiment of this disclosure.

Details of a module configuration of the computer 200 will be described with reference to FIG. 14. FIG. 14 is a block diagram of a detailed configuration of modules of the computer 200 according to one embodiment of this disclosure.

As shown in FIG. 14, the control module 510 includes a virtual camera control module 1421, a field-of-view region determination module 1422, a reference line-of-sight identification module 1423, a virtual space definition module 1424, a virtual object generation module 1425, an operation object control module 1426, a browsing module 1427, and an application module 1428. The rendering module 520 includes a field-of-view image generation module 1438. The memory module 530 holds space information 1431 and user information 1432.

The virtual camera control module 1421 arranges the virtual camera 14 in the virtual space 11. The virtual camera control module 1421 controls an arrangement position of the virtual camera 14 in the virtual space 11 and the direction (inclination) of the virtual camera 14. The field-of-view region determination module 1422 defines the field-of-view region 15 in accordance with the direction of the head of the user 5 wearing the HMD 120 and the arrangement position of the virtual camera 14. The field-of-view image generation module 1438 generates, based on the determined field-of-view region 15, the field-of-view image 17 to be displayed on the monitor 130.

The reference line-of-sight identification module 1423 identifies the line-of-sight of the user 5 based on a signal from the eye gaze sensor 140. The virtual space definition module 1424 defines the virtual space 11 in the HMD system 100 by generating virtual space data representing the virtual space 11. The virtual object generation module 1425 generates an object to be arranged in the virtual space 11.

The operation object control module 1426 arranges, in the virtual space 11, an operation object for receiving an operation of the user 5 in the virtual space 11. The user 5 operates the operation object to operate, for example, the object to be arranged in the virtual space 11. In at least one aspect, the operation object includes, for example, a hand object corresponding to the hand of the user 5 wearing the HMD 120. In at least one aspect, the operation object may correspond to a hand portion of an avatar object to be described later.

The browsing module 1427 enables web browsing in the virtual space 11. In at least one aspect, the browsing module 1427 arranges a web browser (hereinafter, also referred to as a browser window) in the virtual space 11. In at least one aspect, the browsing module 1427 arranges a menu window for receiving an operation of the user 5 related to the web browsing in the virtual space 11. For example, when the user 5 inputs a URL on the browser window or the menu window, the browsing module receives an information resource from a server corresponding to the URL and provides an image based on the information resource in the browser window. In at least one aspect, when the information resource indicates the 360-degree web content, the browsing module 1427 provides an image based on the information resource as a 360-degree web content developed in the virtual space 11 or another virtual space.

The application module 1428 is different from an application program for web browsing, and has a function of executing a dedicated application program (hereinafter, also referred to as a VR application) for viewing VR content. In at least one aspect, the VR application executed by the application module 1428 is capable of providing, as the 360-degree content developed in the virtual space, a screen for selecting moving image content to be reproduced from one or more pieces of moving image content. Such a VR application may be distributed on, for example, a plat form (PF) of the HMD 120.

When each of the objects arranged in the virtual space 11 collides with another object, the control module 510 detects collision. For example, the control module 510 can detect a timing at which a certain object and another object touch each other, and performs predetermined processing when the timing is detected. The control module 510 can detect a timing at which the object and another object are separated from the touching state, and performs the predetermined processing when the timing is detected. The control module 510 can detect that the object and another object touch each other. Specifically, when the operation object and another object touch each other, the control module 510 detects that the operation object and another object touch each other, and performs the predetermined processing.

The memory module 530 holds data used by the computer 200 to provide the user 5 with the virtual space 11. In at least one aspect, the memory module 530 holds the space information 1431 and the user information 1432.

The space information 1431 holds one or more templates defined for providing the virtual space 11. The space information 1431 may include information on the objects arranged in the virtual space 11.

The user information 1432 holds a program for causing the computer 200 to function as a control device of the HMD system 100, a program for causing the browsing module 1427 and the application module 1428 to function, and the like.

[Operation Processing]

Next, operation processing of the computer 200 according to the present embodiment will be described with reference to FIGS. 15 to 22. In the following description, the "360-degree content" refers to, for example, VR content in which the user 5 can freely change a point of view in the virtual space by changing the position, the inclination, and the like of the HMD 120, and is preferably provided as a virtual space including a space image developed at a predetermined angle (e.g., 180 degrees, and 360 degrees), and more preferably provided as a virtual space including a 360-degree space image. In the virtual space including the 360-degree space image, a virtual camera is arranged at a center position of the virtual space, and the 360-degree space image is displayed on a surface of the virtual space.

The "360-degree moving image content" refers to, for example, moving image content provided in the virtual space including a space image developed at the predetermined angle, and is preferably moving image content provided in the virtual space including the 360-degree space image. The "360-degree web content" refers to, for example, web content provided in the virtual space including the space image developed at the predetermined angle, and is preferably provided in the virtual space including the 360-degree space image. On the other hand, simply "web content" refers to, for example, web content provided in a limited region such as the browser window arranged in the virtual space.

First, as a premise, the processor 210 of the computer 200 can execute the VR application as the control module 510. When the VR application is executed, for example, the processor 210 generates a home screen of the VR application in the virtual space including the 360-degree space image. The home screen includes, for example, a selection screen for selecting moving image content to be reproduced from one or more pieces of moving image content, or can transition to a selection screen for selecting the moving image content to be reproduced from one or more pieces of moving image content in accordance with an operation input by the user 5, or satisfies both of the selection screens. When the user 5 selects one piece of moving image content on the selection screen, the processor 210 can reproduce, for example, the selected moving image content as the 360-degree moving image content, and can provide the HMD 120 with the reproduced image.

When the VR application is used, since it is possible to provide the VR application as the 360-degree content from a stage of the home screen, the VR application is excellent from the viewpoint of improving the sense of immersion of the user. On the other hand, the moving image content provided by the VR application is only content permitted by a PF provider of the HMD 120. It is not always possible for a distributor of the moving image content to distribute all of the moving image content desired to be distributed by the VR application, and it is not possible for the user to view all of the moving image content published on the web or the like by the VR application.

In the related art, the moving image content published on the web can be viewed using a VR web browser on the HMD 120. However, in the mode in the related art, since the selection of the moving image content is performed in the browser window arranged in the virtual space, or the like, the sense of immersion is lost compared to the case where the VR application is used. The following disclosure contributes to improvement of such a problem, and relates to viewing of the VR content using the web browser.

Figure 15:
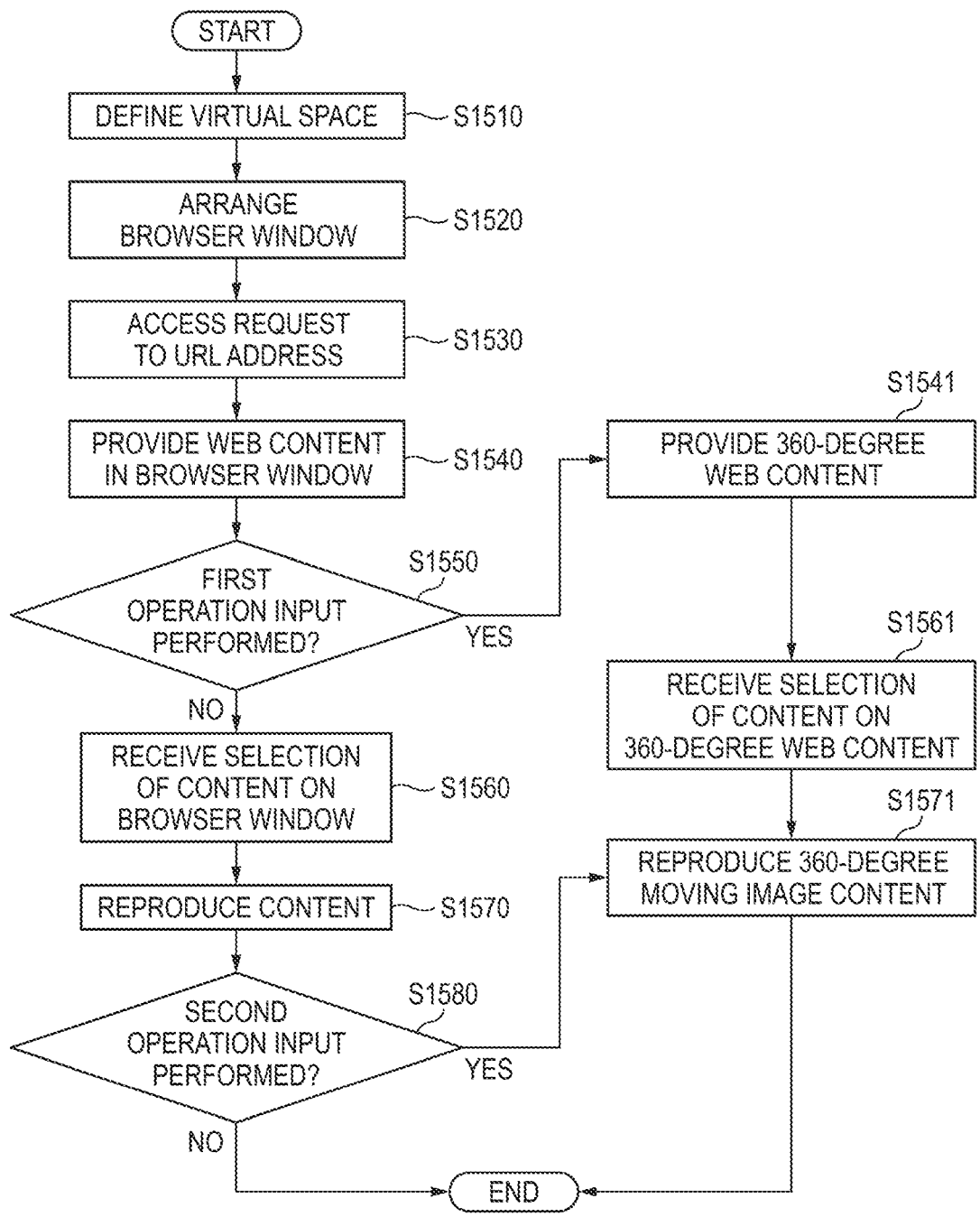
FIG. 15 A flowchart of an example of operation processing executed in the computer according to at least one embodiment of this disclosure.

FIG. 15 is a flowchart of an example of operation processing executed in the computer 200 according to one embodiment of this disclosure.

As shown in FIG. 15, in Step S1510, the processor 210 of the computer 200, serving as the control module 510, identifies the virtual space data and defines the virtual space. The defined virtual space is provided to the HMD 120. The virtual space defined in Step S1510 is a virtual space including a space image developed at a predetermined angle (e.g., 180 degrees, and 360 degrees). In the following description, a virtual space including the 360-degree space image will be described.

In Step S1520, the processor 210 arranges the browser window in the virtual space defined in Step S1510. The browser window may be arranged, for example, in accordance with an operation for executing the web browser performed by the user 5, or may be arranged as an initial object to be arranged in the virtual space when the virtual space is defined in Step S1510.

At the same time as Step S1520, the processor 210 may arrange, in the virtual space, a menu object that displays an operation menu when the web browsing is performed, and an information display object that displays supplementary information, advertisement information, and the like related to the web content displayed in the browser window.

In Step S1530, the processor 210 receives an access request to a URL address. In at least one aspect, in Step S1530, the access request to the URL address specifying a server that provides the VR moving image content is received. In the following description, in Step S1530, it is assumed that there is an access request to the server that provides the VR moving image content.

The access request is executed based on, for example, the operation input by the user 5. The processor 210 accesses a specified server based on the access request, and acquires, for example, an information resource for developing a home screen (top page) of the web content provided by the server in the browser window.

In Step S1540, the processor 210 provides the web content in the browser window based on the acquired information resource. The web content provided in Step S1540 includes a web screen for selecting the moving image content to be reproduced from one or more pieces of moving image content.

In Step S1550, when a first operation input is not performed by the user (No in Step S1550), the processor 210 continues providing the web content in the browser window, and proceeds to a series of processing of Steps S1560, S1570, and S1580. The series of processing will be described in detail later.

Here, the first operation input is an operation input for proceeding to Step S1541. The first operation input is not particularly limited, and examples thereof include a predetermined operation input to the controller 300 and an operation input for virtually pressing a virtual button.

In Step S1550, when the first operation input is performed by the user (Yes in Step S1550), the processor 210 proceeds to Step S1541.

In Step S1541, the processor 210 provides the HMD 120 with the 360-degree web content developed in the virtual space including the 360-degree space image, instead of the web content provided in a browser window 1621. Specifically, when the first operation input is performed, the processor 210 establishes a communication connection with the server and acquires an information resource for providing the 360-degree web content to the HMD 120. The processor 210 provides the 360-degree web content to the HMD 120 based on the information resource. The 360-degree web content provided in Step S1541 corresponds to the web content provided in Step S1540, and includes the web screen for selecting the moving image content to be reproduced from one or more pieces of moving image content.

Hereinafter, the difference between the web content provided in S1540 and the 360-degree web content provided in S1541 will be described in detail with reference to FIGS. 16 and 17 and FIGS. 18 to 20.

Figure 16:
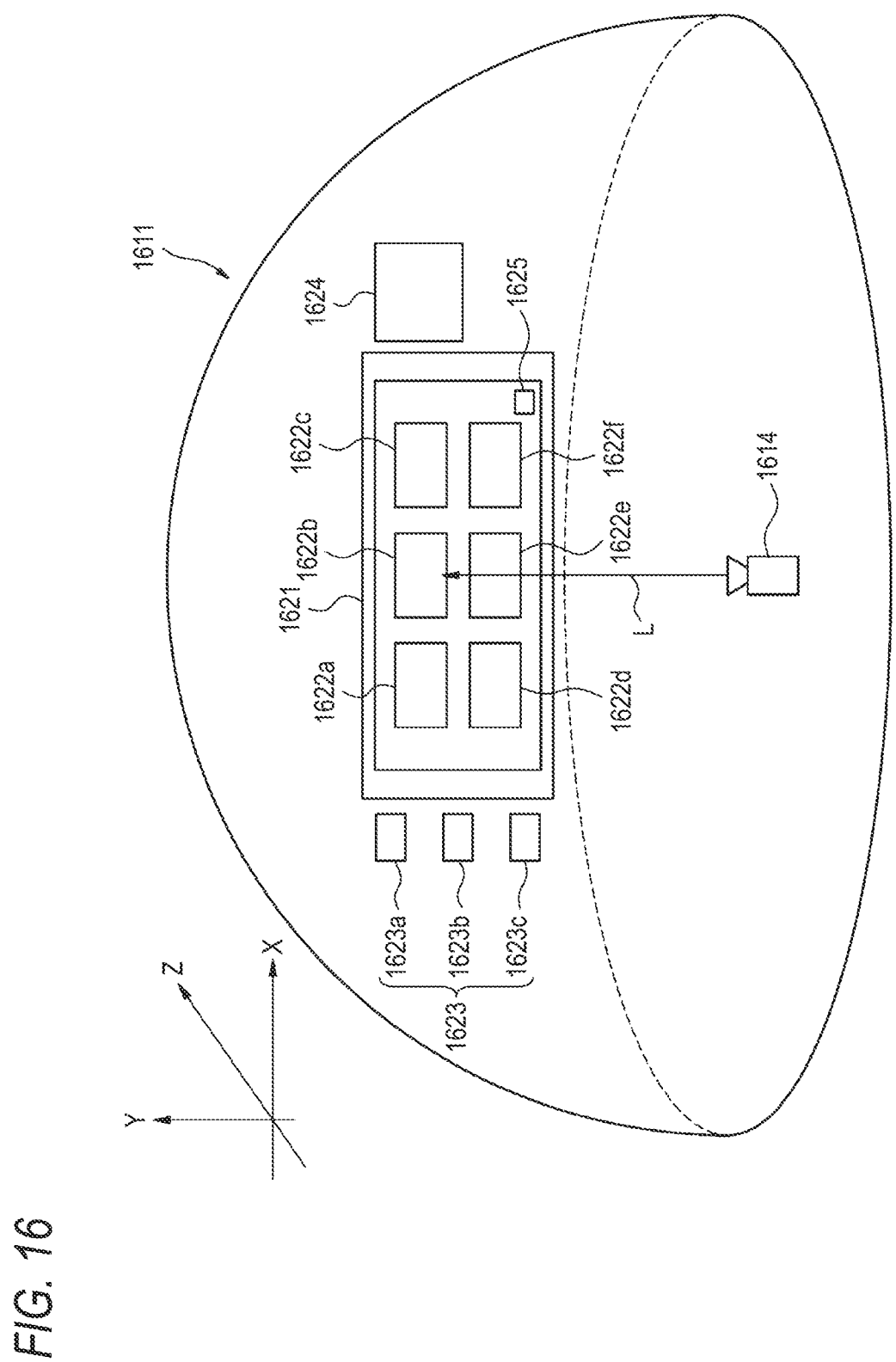
FIG. 16 A schematic diagram of an example of the virtual space according to at least one embodiment of this disclosure.
Figure 17:
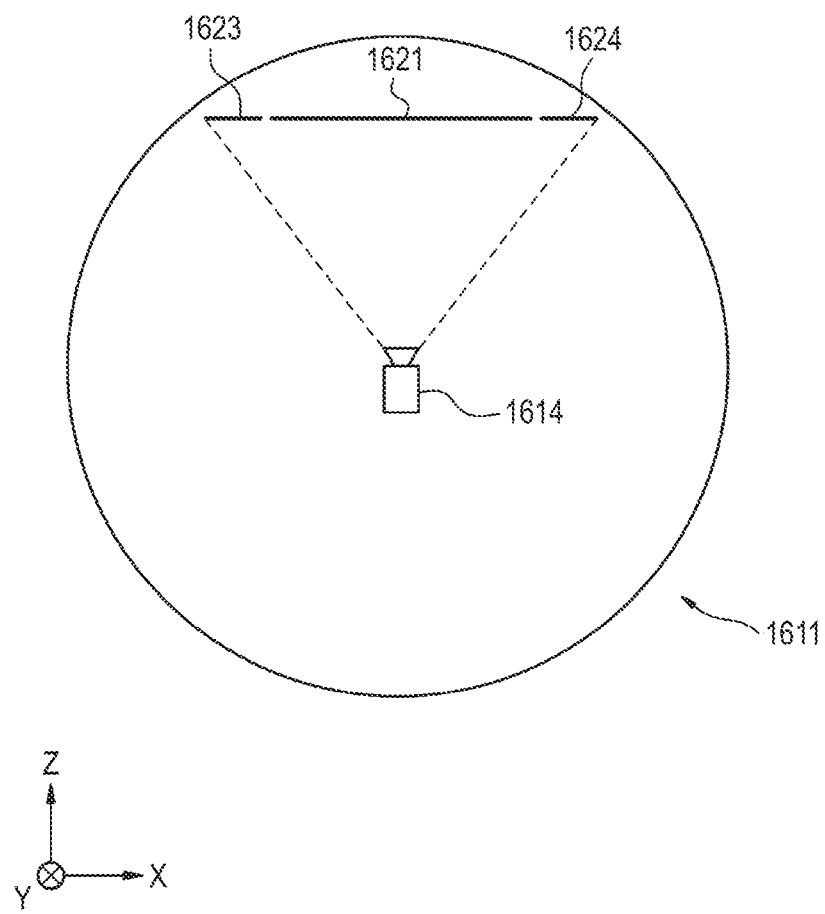
FIG. 17 A schematic diagram of the XZ cross section of the virtual space shown in FIG. 16 viewed from a Y-axis direction.

FIG. 16 is a schematic diagram of an example of a virtual space 1611 according to one embodiment of this disclosure, and specifically, is a schematic diagram of the virtual space 1611 provided to the HMD 120 in the processing of Step S1540. FIG. 17 is a schematic diagram showing the XZ cross section of the virtual space 1611 shown in FIG. 16 viewed from the Y-axis direction.

As shown in FIGS. 16 and 17, the browser window 1621, a menu object 1623, an information display object 1624, and a virtual camera 1614 are arranged in the virtual space 1611.

The web content provided from the server is displayed in the browser window 1621. Specifically, a web screen for selecting the moving image content desired to be reproduced by the user from the moving image content distributed by the server is displayed. In the example of FIG. 16, six pieces of moving image content 1622 (1622*a* to 16220 are displayed in the browser window 1621. The moving image content 1622 includes, for example, a thumbnail image of each piece of moving image content.

A shape or the like of the browser window 1621 is not particularly limited. For example, the browser window is generally a planar plate shape as shown in FIGS. 16 and 17. Therefore, the web screen for selecting the moving image content is only displayed in a planar manner. In FIG. 17, a dotted line extending from the virtual camera 1614 indicates the field-of-view region of the user 5.

In the menu object 1623, an operation menu for web browsing is displayed. When the user performs the operation input on the menu object 1623, for example, a display content in the browser window 1621 is changed. In the example of FIG. 16, there are three menu objects 1623*a* to 1623*c*, and different operation menus are displayed for the menu objects 1623*a* to 1623*c*, respectively. The menu object 1623 may be integrated with the browser window 1621 or may be arranged so as to be superimposed on the browser window 1621.

Predetermined information is displayed in the information display object 1624. Examples of the predetermined information include, but are not particularly limited to, the supplementary information related to the moving image content 1622 displayed in the browser window 1621. In the example of FIG. 16, for example, information related to moving image content 1622b on a line-of-sight L of the virtual camera 1614 may be displayed. The information display object 1624 may be integrated with the browser window 1621 or may be arranged so as to be superimposed on the browser window 1621.

A first operation button 1625 is displayed in a lower right portion of the browser window 1621. When the operation input for selecting the first operation button 1625 is performed by the user 5, the processing of Step S1541 described above is performed, and the web content provided in the browser window 1621 is provided to the HMD 120 as the 360-degree web content developed in the virtual space including the 360-degree space image.

Figure 18:
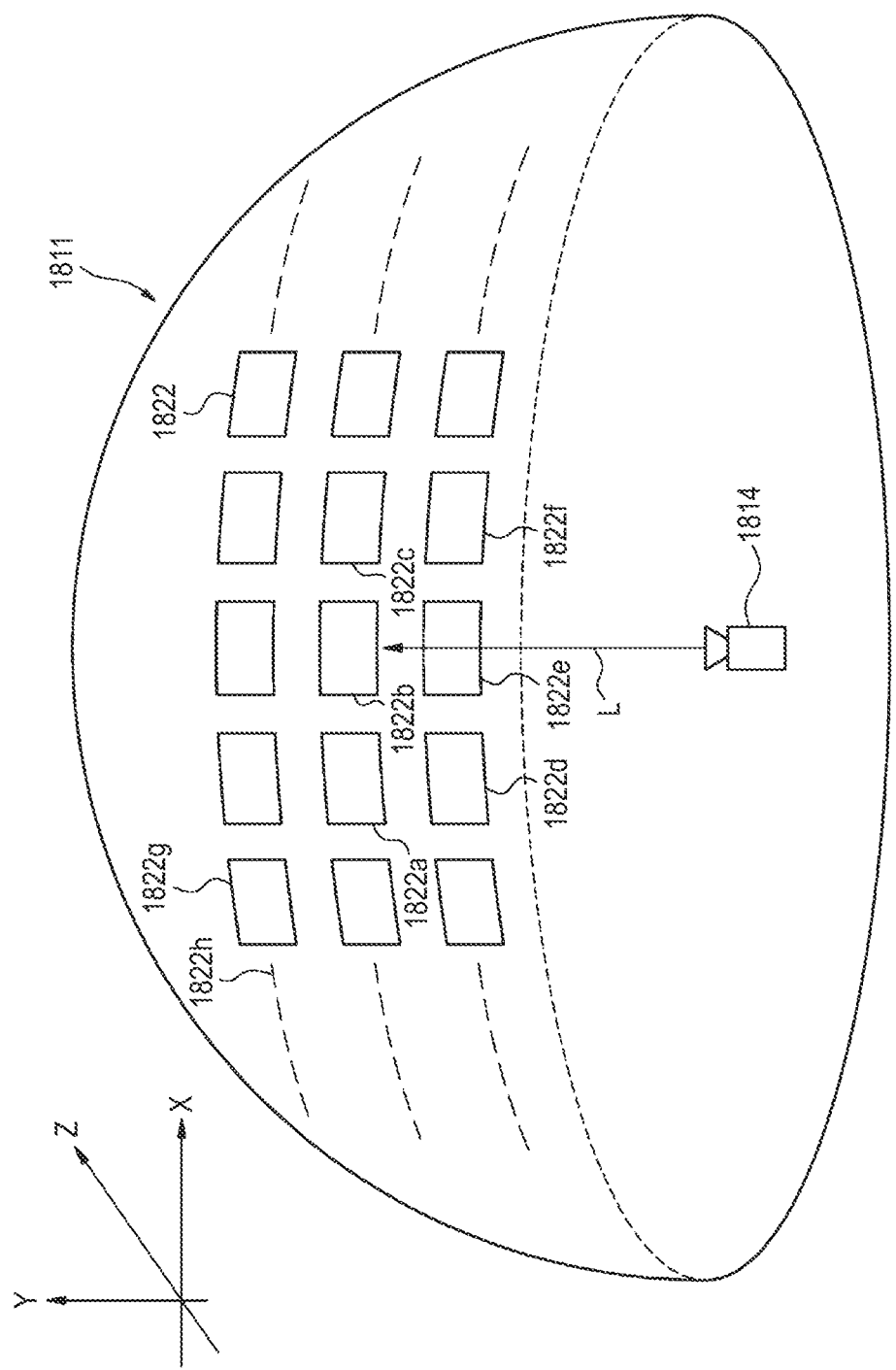
FIG. 18 A schematic diagram of an example of the virtual space according to at least one embodiment of this disclosure.
Figure 19:
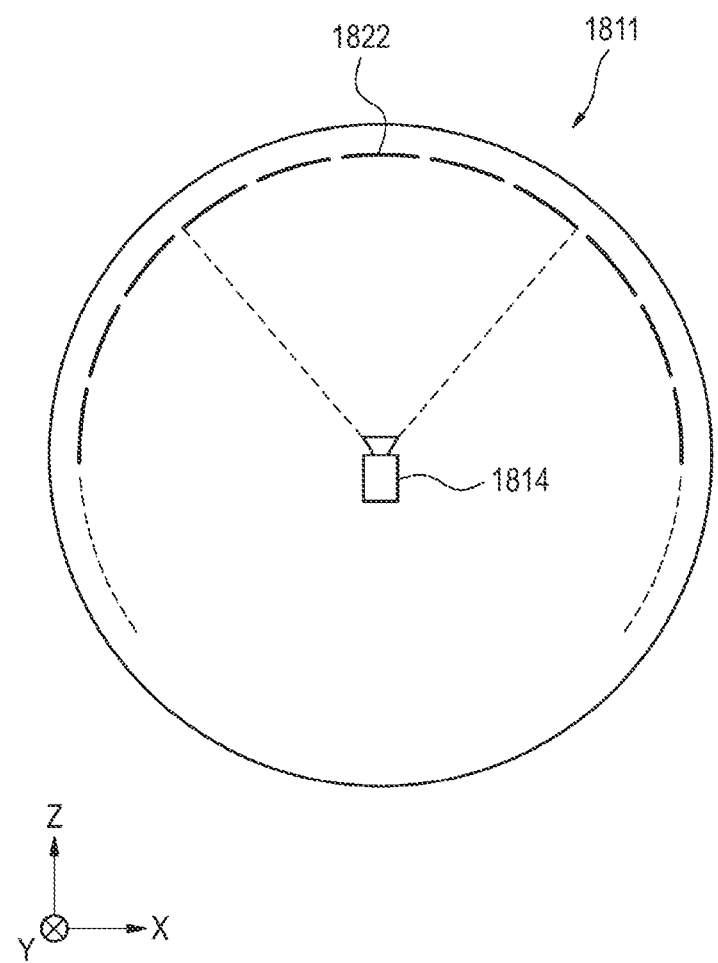
FIG. 19 A schematic diagram of the XZ cross section of the virtual space shown in FIG. 18 viewed from the Y-axis direction.
Figure 20:
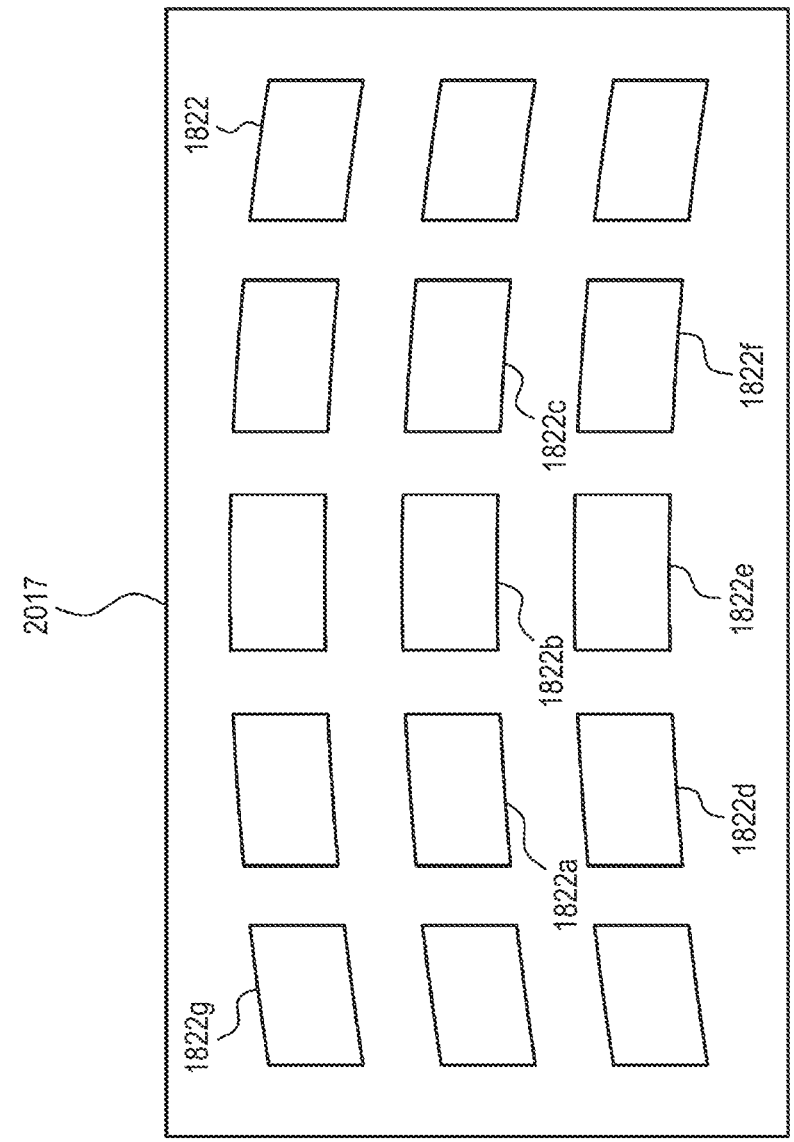
FIG. 20 A schematic diagram of a field-of-view image of a user 5 in FIG. 18.

FIG. 18 is a schematic diagram of an example of a virtual space 1811 according to one embodiment of this disclosure, and specifically, a schematic diagram of the virtual space 1811 provided to the HMD 120 in the processing of Step S1541. FIG. 19 is a schematic diagram showing the XZ cross section of the virtual space 1811 shown in FIG. 18 viewed from the Y-axis direction. FIG. 20 is a schematic diagram of a field-of-view image 2017 of the user 5 in FIG. 18.

As shown in FIGS. 18 and 19, a plurality of pieces of moving image content 1822 (including moving image content 1822a to 1822h) and a virtual camera 1814 are arranged in the virtual space 1811. The virtual space 1811 and the virtual camera 1814 may be the same as or different from the virtual space 1611 and the virtual camera 1614, respectively. The shape of the virtual space 1811 is not particularly limited, and is, for example, a hemispherical shape or a celestial sphere. In FIG. 19, a dotted line extending from the virtual camera 1814 indicates the field-of-view region of the user 5.

A plurality of pieces of moving image content 1822 are developed as the 360-degree web content in the virtual space 1811. The plurality of pieces of moving image content 1822 are arranged along an outer edge of the virtual space 1811. Among the plurality of pieces of moving image content 1822, the moving image content 1822a to 1822f indicate the same moving image content as the moving image content 1622a to 1622f in FIG. 16, respectively. That is, the selection screen provided as the web content in Step S1540 and the selection screen provided as the 360-degree web content in Step S1541 correspond to each other.

However, even if the selection screens correspond to each other, when the selection screen is provided as the 360-degree web content, it is possible to expect one or more effects as described below, which are difficult to obtain when the selection screen is provided as the web content.

A first effect is, for example, improvement in operability of the user. When the selection screen is provided as the web content, the selection screen is displayed in the browser window, whereas the selection screen (e.g., the home screen) is not optimized for the VR browser window, and thus it is often difficult for the user to use. On the other hand, when the selection screen is provided as the 360-degree web content, it is possible to eliminate limitation of displaying the selection screen in the browser window, and thus it is possible to provide the selection screen in a manner that is easy for the user to use.

For example, in a state in which the field-of-view image 2017 shown in FIG. 20 is provided to the user 5, the user 5 can fit the moving image content arranged on a left side of moving image content 1822g (e.g., the moving image content 1822h) into the field-of-view image 2017 by simply moving the head so that the head rotates in a left direction about the yaw axis. On the other hand, when the selection screen is displayed in the browser window 1621, the selection screen displayed in the browser window 1621 is not changed even if the user 5 moves his or her head. In order to change the content displayed in the browser window 1621, for example, an operation on the menu object 1623 or the controller 300 is required.

A second effect is, for example, improvement in the sense of immersion in the virtual space. When the selection screen is provided as the web content, even if the selection screen (e.g., the home screen) is optimized for the VR browser window, the selection screen is only displayed on a planar browser window. Therefore, the sense of immersion unique to VR cannot be obtained. On the other hand, when the selection screen is provided as the 360-degree web content, it is possible to perform the selection in the virtual space developed over 360 degrees from the stage of selecting the moving image content (e.g., the stage of displaying the home screen) as in the VR application described above. As a result, it is possible to increase the sense of immersion in the virtual space.

When the selection screen is provided as the 360-degree web content, it is preferable that an arrangement mode of one or more pieces of moving image content to be selected corresponds to (e.g., is similar to or the same as) the arrangement mode on the selection screen provided by the VR application. With such a configuration, the user can obtain a sense of use and the sense of immersion similar to those when the VR application is used.

In the case of the VR web browser, since an application programming interface (API) is not optimized, it is difficult to create content such as the VR application by using an API prepared by the PF provider since a processing load is too large. Therefore, in order to implement a content selection screen (e.g., the home screen) as the 360-degree space image, it is preferable to use a technique of a low layer (e.g., a language) closer to a layer on a hardware side, rather than using the API prepared by the PF provider.

It is preferable that a state in which the selection screen is provided as the 360-degree web content can be changed to a state in which the selection screen is provided as the web content based on an operation input of the user. According to such an aspect, for example, it is possible to respond to a request of the user to select the content in the browser window 1621 because of a sign of VR motion sickness is seen.

The description returns to the flowchart of FIG. 15. After Step S1541, in Step S1561, the processor 210 receives selection of the moving image content 1622 to be reproduced on the 360-degree web content. The selection of the moving image content 1622 in Step S1561 is performed, for example, by the user 5 stopping his or her line-of-sight for a predetermined time or more on any one of the moving image content 1622 desired to be reproduced, or by an operation input to the controller 300 or the like.

After Step S1561, in Step S1571, the processor 210 reproduces the 360-degree moving image content, develops the reproduced image into the virtual space as the 360-degree space image, and provides the virtual space image to the HMD 120. Specifically, the processor 210 acquires, from the server, an information resource for providing the selected moving image content as the 360-degree moving image content to the HMD 120, and provides the selected moving image content to the HMD 120 based on the acquired information resource.

Figure 21:
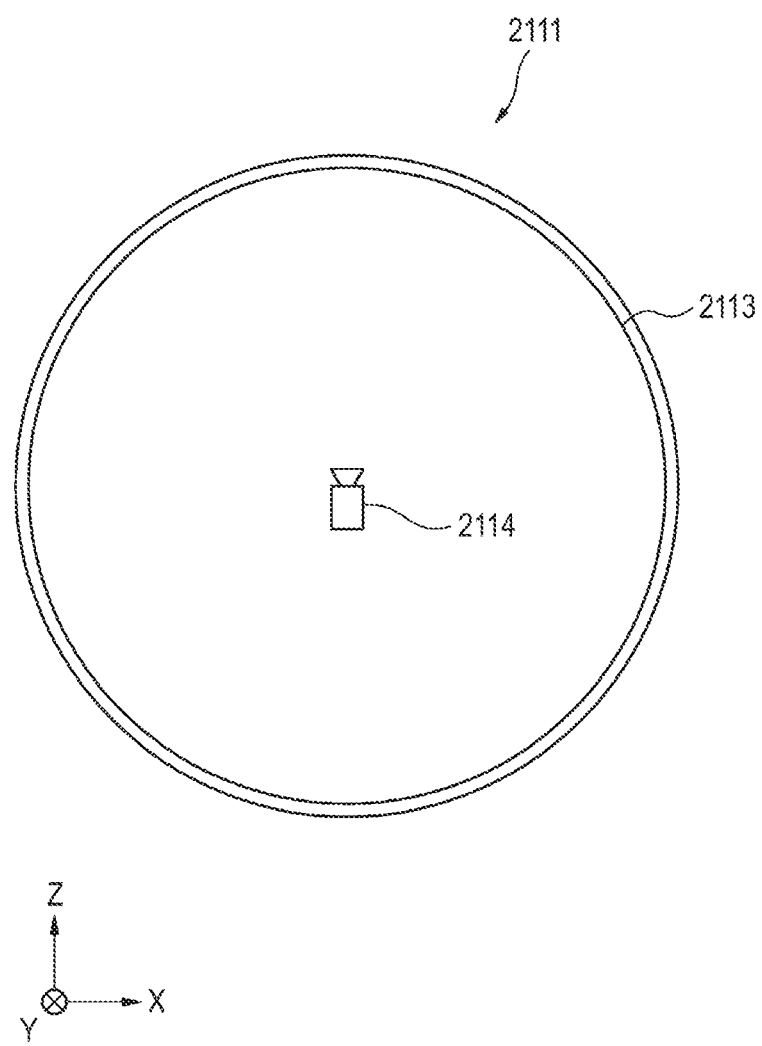
FIG. 21 A schematic diagram of the XZ cross section obtained by viewing the virtual space according to at least one embodiment of this disclosure from the Y-axis direction.

FIG. 21 is a schematic diagram of the XZ cross section obtained by viewing the virtual space according to one embodiment of this disclosure from the Y-axis direction, and specifically, is a schematic diagram of a virtual space 2111 provided to the HMD 120 in the processing of Step S1561.

As shown in FIG. 21, in the virtual space 2111, a virtual camera 2114 is arranged, and a panoramic image 2113 is developed along an outer edge of the virtual space 2111. A line-of-sight of the virtual camera 2114 is interlocked with the movement of the head of the user 5. With such a configuration, it is possible to provide the user with intuitive operability and a high sense of immersion even when viewing the moving image content by the web browsing.

In the present embodiment, the series of processing of Steps S1541, S1561, and S1571 is continuously performed in the virtual space including the 360-degree space image. Therefore, even when the moving image content is viewed by the VR web browser, the user can obtain the high sense of immersion from the stage of selecting the moving image content, and can enjoy the moving image content while maintaining the sense of immersion.

Hereinafter, a series of processing in the case of No in Step S1550 will be described. In Step S1560, the processor 210 receives selection of the moving image content 1622 to be reproduced on the browser window 1621. The selection of the moving image content 1622 in Step S1560 is performed by, for example, the operation input to the controller 300 or the like.

After Step S1560, in Step S1570, the processor 210 reproduces the moving image content and displays the reproduced image in the browser window 1621. Specifically, the processor 210 acquires, from the server, an information resource for displaying the selected moving image content in the browser window 1621, and displays the moving image content in the browser window 1621 based on the acquired information resource.

In Step S1580, when a second operation input is not performed by the user (No in Step S1580), for example, the processor 210 continues the processing of Step S1570 until a condition of ending the reproduction of the moving image content is satisfied.

Here, the second operation input is an operation input for proceeding to Step S1571. The second operation input is not particularly limited, and examples thereof include a predetermined operation input to the controller 300 and an operation input for virtually pressing a virtual button.

On the other hand, when the second operation input is performed by the user in Step S1580 (Yes in Step S1580), the processor 210 proceeds to Step S1571 described above. Step S1580 is executed, for example, in a situation where the moving image content 1622 is being reproduced in the browser window 1621 in Step S1570.

Figure 22:
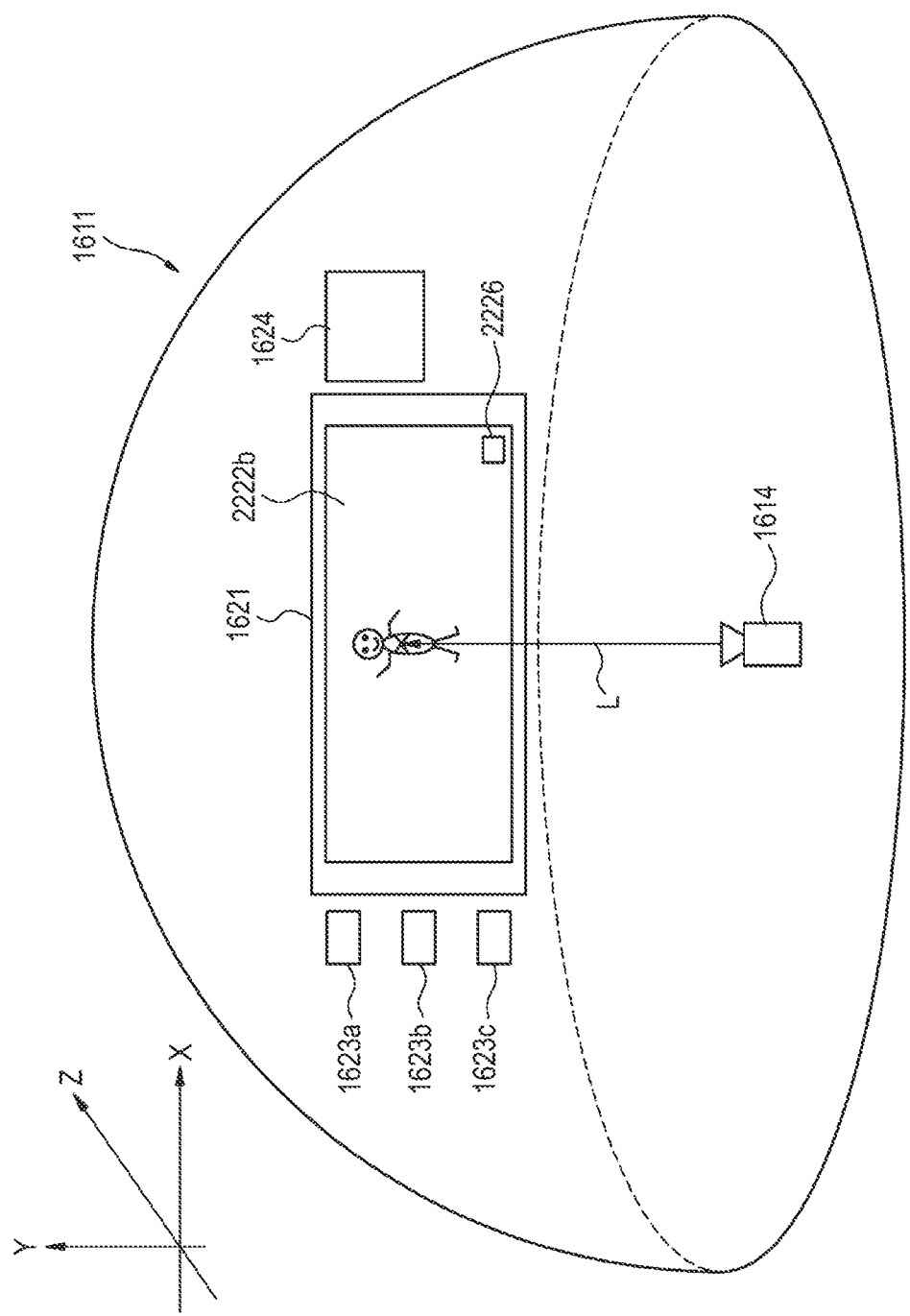
FIG. 22 A schematic diagram of an example of the virtual space according to at least one embodiment of this disclosure.

FIG. 22 is a schematic diagram of an example of the virtual space 1611 according to one embodiment of this disclosure, and specifically, a schematic diagram of the virtual space 1611 provided to the HMD 120 in the processing of Step S1570.

As shown in FIG. 22, the browser window 1621, the menu object 1623, the information display object 1624, and the virtual camera 1614 are arranged in the virtual space 1611.

In the browser window 1621, an image of moving image content 2222b selected as a reproduction target by the user 5 is displayed. The moving image content 2222b is, for example, moving image content corresponding to the moving image content 1622b of FIG. 16.

A second operation button 2226 is displayed in a lower right portion of the browser window 1621. When the operation input for selecting the second operation button 2226 is performed by the user 5, the processing of Step S1571 described above is performed, and the moving image content 2222b reproduced in the browser window 1621 is developed in the virtual space as the 360-degree space image and provided to the HMD 120.

As described above, in the example of FIG. 22, although the HMD 120 views the moving image content 2222b, the moving image content 2222b is displayed only in the planar web browser 1611, and thus it is difficult to obtain the sense of immersion unique to VR. However, when the second operation button 2226 is virtually pressed, the moving image content 2222b that is reproduced can be developed in the virtual space as the 360-degree space image. Therefore, even when moving image content is viewed by the web browsing, the user can obtain the high sense of immersion.

It is preferable that a state in which the moving image is provided as the 360-degree moving image content can be changed to a state in which the moving image is provided in the browser window based on the operation input of the user. According to such an aspect, for example, it is possible to respond to the request of the user to view the content in the browser window 1621 since the sign of the VR motion sickness is seen.

The above embodiments are merely examples for facilitating understanding of the present invention, and are not to be construed as limiting the present invention. It is needless to say that the present invention can be modified and improved without departing from the gist thereof, and the present invention includes equivalents thereof.

In the above embodiment, the virtual space (VR space) in which the user is immersed by the HMD has been described as an example, whereas a transmissive HMD may be adopted as the HMD. In this case, by outputting a field-of-view image in which a part of an image constituting a virtual space is combined with a real space visually recognized by a user via a transmissive HMD, a virtual experience in an augmented reality (AR) space or a mixed reality (MR) space may be provided to the user. In this case, an action on a target object in the virtual space may be generated based on a movement of a hand of the user instead of an operation object. Specifically, the processor may identify coordinate information of a position of the hand of the user in the real space and define a position of the target object in the virtual space in relation to the coordinate information in the real space. In this manner, the processor grasps a positional relationship between the hand of the user in the real space and the target object in the virtual space, and can execute processing corresponding to the above-described collision control or the like between the hand of the user and the target object. As a result, it is possible to apply an action to the target object based on the movement of the hand of the user.

[Supplementary Notes]

Contents of the present disclosure are listed as follows.

(Item 1)

A program executed by a computer including a processor, the program causes the processor to perform: a step of defining a virtual space including a web browser; a step of providing web content on the web browser based on an access to a uniform resource locator (URL) address; a step of providing the web content displayed on the web browser as a 360-degree web content developed in the virtual space based on a first operation input of a user; a step of controlling a field-of-view from a virtual camera arranged in the virtual space in accordance with a movement of a head of the user; and a step of displaying a field-of-view image corresponding to the field-of-view on an image display apparatus associated with the head of the user, wherein the web content and the 360-degree web content are web screens for selecting moving image content to be reproduced from one or more pieces of moving image content.

In this manner, it is possible to improve the sense of immersion of the user when the VR content is used by using the web browser.

(Item 2)

The program according to the Item 1, wherein the program further causes the processor to perform: when the moving image content to be reproduced is selected on the 360-degree web content, a step of reproducing the selected moving image content as a 360-degree moving image content developed in the virtual space.

In this manner, it is possible to shift from the 360-degree web content to the 360-degree moving image content. As a result, it is possible to further improve the sense of immersion of the user when the VR content is used by using the web browser.

(Item 3)

The program according to the Item 1 or 2, wherein the first operation input is an operation of selecting a first virtual button arranged on the web content.

In this manner, the user can receive the 360-degree web content by one operation, and thus convenience of the user can be improved. In addition, since the time required to provide the 360-degree web content is shortened, the sense of immersion of the user when the VR content is used by using the web browser is also improved.

(Item 4)

The program according to any one of the items 1 to 3, wherein the program further causes the processor to perform: a step of reproducing, when the moving image content to be reproduced is selected on the web content, the selected moving image content on the web browser; and a step of reproducing the moving image content being reproduced on the web browser as the 360-degree moving image content developed in the virtual space based on a second operation input of the user.

In this manner, it is possible to improve the sense of immersion of the user when the VR content is used by using the web browser, and to provide the user with various use modes such as selecting the content on the web browser and viewing the moving image as the 360-degree content.

(Item 5)

The program according to the item 4, wherein the second operation input is an operation of selecting a second virtual button arranged on the web content.

In this manner, the user can receive the 360-degree moving image content by one operation, and thus the convenience of the user can be improved. In addition, since the time required to provide the 360-degree moving image content is shortened, the sense of immersion of the user when the VR content is used by using the web browser is also improved.

(Item 6)

The program according to any one of the items 1 to 5, wherein the computer has a predetermined application function different from the web browser, wherein the computer is configured to provide, as a 360-degree content developed in the virtual space, a screen for selecting the moving image content to be reproduced from one or more pieces of moving image content in accordance with execution of the application function, and wherein an arrangement mode of one or more pieces of moving image content to be selected on the web screen provided as the 360-degree web content corresponds to an arrangement mode of one or more pieces of moving image content to be selected on the screen provided in accordance with execution of the application function.

In this manner, it is possible to enjoy the use of the content using the web browser with the same sense of use as that of the VR application. For example, even when certain content is not provided on the VR application but is provided on the web, the user can obtain the same sense of use and the same sense of immersion as when using the VR application.

(Item 7)

An information processing method executed in a computer including a processor, the information processing method includes causing the processor to perform: a step of defining a virtual space including a web browser; a step of providing web content on the web browser based on an access to a uniform resource locator (URL) address; a step of providing the web content displayed on the web browser as a 360-degree web content developed in the virtual space based on a first operation input of a user; a step of controlling a field-of-view from a virtual camera arranged in the virtual space in accordance with a movement of a head of the user; and a step of displaying a field-of-view image corresponding to the field-of-view on an image display apparatus associated with the head of the user, wherein the web content and the 360-degree web content are web screens for selecting moving image content to be reproduced from one or more pieces of moving image content.

In this manner, it is possible to improve the sense of immersion of the user when the VR content is used by using the web browser.

(Item 8)

An information processing apparatus includes a processor, wherein the processor is configured to: define a virtual space including a web browser; provide web content on the web browser based on an access to a uniform resource locator (URL) address; provide the web content displayed on the web browser as a 360-degree web content developed in the virtual space based on a first operation input of a user; control a field-of-view from a virtual camera arranged in the virtual space in accordance with a movement of a head of the user; and display a field-of-view image corresponding to the field-of-view on an image display apparatus associated with the head of the user, and wherein the web content and the 360-degree web content are web screens for selecting moving image content to be reproduced from one or more pieces of moving image content.

In this manner, it is possible to improve the sense of immersion of the user when the VR content is used by using the web browser.

The present application is based on Japanese Patent Application (Patent Application No. 2019-118918) filed on Jun. 26, 2019, and the contents thereof are incorporated herein as reference.

REFERENCE SIGNS LIST

2: network
11, 1611, 1811, 2111: Virtual space
14, 14A, 1614, 1814, 2114: Virtual camera
17, 17A, 2017: Field-of-view image
100: HMD system
110, 110A, 110B, 110C, 110D: HMD set
120, 120A, 120B: HMD
200, 200A, 200B: Computer
210, 210A, 210B, 210C, 610: Processor
220, 620: Memory
230, 630: Storage
300, 300B: Controller
510: Control module
520: Rendering module 530: Memory module
600: Server
700: External device
1621: Browser window
1622, 1822: Moving image content

The invention claimed is:

1. A non-transitory computer-readable medium storing a computer program readable by a computer, the computer program, when executed by a processor, causing the computer to perform:
   defining a virtual space including a web browser;
   providing a web content on the web browser based on an access to a uniform resource locator (URL) address;
   providing the web content displayed on the web browser as a newly-developed 360-degree web content in the virtual space based on a first operation input of a user;
   controlling a field-of-view from a virtual camera arranged in the virtual space in accordance with a movement of a head of the user;
   displaying a field-of-view image corresponding to the field-of-view on an image display apparatus associated with the head of the user,
   wherein the web content and the newly-developed 360-degree web content are web screens for selecting moving image content to be reproduced from one or more pieces of a moving image content based on a display of the web screens of the web content and the newly-developed 360-degree web content on the virtual space, and
   wherein the providing of the web content, the computer is configured to provide the newly-developed 360-degree web content along a shape of the virtual space.

2. The non-transitory computer-readable medium according to claim 1,
   wherein the computer program, when executed by the computer, further causes the computer to perform:
   when the moving image content to be reproduced is selected on the newly-developed 360-degree web content, reproducing the selected moving image content as a 360-degree moving image content developed in the virtual space.

3. The non-transitory computer-readable medium according to claim 1,
   wherein the first operation input is an operation of selecting a first virtual button arranged on the web content.

4. The non-transitory computer-readable medium according to claim 1,
   wherein the computer program, when executed by the computer, further causes the computer to perform:
   when the moving image content to be reproduced is selected on the web content, reproducing the selected moving image content on the web browser; and
   reproducing the moving image content being reproduced on the web browser as a 360-degree moving image content developed in the virtual space based on a second operation input of the user.

5. The non-transitory computer-readable medium according to claim 4,
   wherein the second operation input is an operation of selecting a second virtual button arranged on the web content.

6. The non-transitory computer-readable medium according to claim 1,
   wherein the computer has a predetermined application function different from the web browser,
   wherein the computer is configured to provide, as a 360-degree content developed in the virtual space, a screen for selecting the moving image content to be reproduced from one or more pieces of moving image content in accordance with execution of the application function, and
   wherein an arrangement mode of one or more pieces of moving image content to be selected on the web screen provided as the newly-developed 360-degree web content corresponds to an arrangement mode of one or more pieces of moving image content to be selected on the screen provided in accordance with execution of the application function.

7. An information processing method executed a computer, the information processing method comprising causing the computer to perform:
   defining a virtual space including a web browser;
   providing web content on the web browser based on an access to a uniform resource locator (URL) address;
   providing the web content displayed on the web browser as a newly-developed 360-degree web content in the virtual space based on a first operation input of a user;
   controlling a field-of-view from a virtual camera arranged in the virtual space in accordance with a movement of a head of the user;
   displaying a field-of-view image corresponding to the field-of-view on an image display apparatus associated with the head of the user,
   wherein the web content and the 360-degree web content are web screens for selecting a moving image content to be reproduced from one or more pieces of moving image content based on a display of the web screens of the web content and the newly-developed 360-degree web content on the virtual space, and
   wherein the providing of the web content, the computer is configured to provide the newly-developed 360-degree web content along a shape of the virtual space.

8. The information processing method according to claim 7, further comprising:
   when the moving image content to be reproduced is selected on the newly-developed 360-degree web content, reproducing the selected moving image content as a 360-degree moving image content developed in the virtual space.

9. The information processing method according to claim 7, wherein the first operation input is an operation of selecting a first virtual button arranged on the web content.

10. The information processing method according to claim 7, further comprising:
    when the moving image content to be reproduced is selected on the web content, reproducing the selected moving image content on the web browser; and
    reproducing the moving image content being reproduced on the web browser as a 360-degree moving image content developed in the virtual space based on a second operation input of the user.

11. The information processing method according to claim 10, wherein the second operation input is an operation of selecting a second virtual button arranged on the web content.

12. The information processing method according to claim 7,
    wherein the computer has a predetermined application function different from the web browser,
    wherein the computer is configured to provide, as a 360-degree content developed in the virtual space, a screen for selecting the moving image content to be reproduced from one or more pieces of moving image content in accordance with execution of the application function, and wherein an arrangement mode of one or more pieces of moving image content to be selected on the web screen provided as the newly-developed 360-degree web content corresponds to an arrangement mode of one or more pieces of moving image content to be selected on the screen provided in accordance with execution of the application function.

13. An information processing apparatus comprising:

a processor: and memory storing instructions which, when executed by the processor, causing the information processing apparatus to perform:

defining a virtual space including a web browser;

providing web content on the web browser based on an access to a uniform resource locator (URL) address;

providing the web content displayed on the web browser as a newly-developed 360-degree web content in the virtual space based on a first operation input of a user;

controlling a field-of-view from a virtual camera arranged in the virtual space in accordance with a movement of a head of the user;

displaying a field-of-view image corresponding to the field-of-view on an image display apparatus associated with the head of the user, wherein the web content and the newly-developed 360-degree web content are web screens for selecting a moving image content to be reproduced from one or more pieces of moving image content based on a display of the web screens of the web content and the newly-developed 360-degree web content on the virtual space, and wherein the providing of the web content, the computer is configured to provide the newly-developed 360-degree web content along a shape of the virtual space.

14. The information processing apparatus according to claim 13, wherein the memory further stores instructions which, when executed by the processor, causing the information processing apparatus to perform:

when the moving image content to be reproduced is selected on the newly-developed 360-degree web content, reproducing the selected moving image content as a 360-degree moving image content developed in the virtual space.

15. The information processing apparatus according to claim 13, wherein the first operation input is an operation of selecting a first virtual button arranged on the web content.

16. The information processing apparatus according to claim 13, wherein the memory further stores instructions which, when executed by the processor, causing the information processing apparatus to perform:

when the moving image content to be reproduced is selected on the web content, reproducing the selected moving image content on the web browser; and reproducing the moving image content being reproduced on the web browser as a 360-degree moving image content developed in the virtual space based on a second operation input of the user.

17. The information processing apparatus according to claim 16, wherein the second operation input is an operation of selecting a second virtual button arranged on the web content.

18. The information processing apparatus according to claim 13, further comprising:

a computer including the processor, wherein the computer has a predetermined application function different from the web browser, wherein the computer is configured to provide, as a 360-degree content developed in the virtual space, a screen for selecting the moving image content to be reproduced from one or more pieces of moving image content in accordance with execution of the application function, and wherein an arrangement mode of one or more pieces of moving image content to be selected on the web screen provided as the newly-developed 360-degree web content corresponds to an arrangement mode of one or more pieces of moving image content to be selected on the screen provided in accordance with execution of the application function.

* * * * *